(12) United States Patent  
Tarbox et al.

(10) Patent No.: US 9,191,422 B2  
(45) Date of Patent: Nov. 17, 2015

(54) PROCESSING OF SOCIAL MEDIA FOR SELECTED TIME-SHIFTED MULTIMEDIA CONTENT

(71) Applicant: General Instrument Corporation, Horsham, PA (US)

(72) Inventors: Brian J Tarbox, Littleton, MA (US); Stewart M Wiener, Oreland, PA (US)

(73) Assignee: ARRIS Technology, Inc., Suwanee, GA (US)

( * ) Notice: Subject to any disclaimer, the term of this patent is extended or adjusted under 35 U.S.C. 154(b) by 438 days.

(21) Appl. No.: 13/855,687

(22) Filed: Apr. 2, 2013

(65) Prior Publication Data

US 2014/0297745 A1  Oct. 2, 2014

Related U.S. Application Data

(60) Provisional application No. 61/802,076, filed on Mar. 15, 2013.

(51) Int. Cl.
 *G06F 15/16* (2006.01)
 *H04L 29/06* (2006.01)

(52) U.S. Cl.
 CPC ........ *H04L 65/1089* (2013.01); *H04L 65/4053* (2013.01); *H04L 65/604* (2013.01)

(58) Field of Classification Search
 CPC ............ H04L 65/1089; H04L 65/4053; H04L 65/604
 USPC ......... 709/204, 205, 206, 207, 228, 229, 231, 709/232, 246
 See application file for complete search history.

(56) References Cited

U.S. PATENT DOCUMENTS

| 5,874,965 | A  | 2/1999  | Takai et al. |
| 6,404,978 | B1 | 6/2002  | Abe |
| 6,486,896 | B1 | 11/2002 | Ubillos |
| 6,711,293 | B1 | 3/2004  | Lowe |
| 6,892,179 | B1 | 5/2005  | Zacharia |
| 6,940,558 | B2 | 9/2005  | Lu et al. |

(Continued)

OTHER PUBLICATIONS

S. Basapur, et al., "FANFEEDS: evaluation of socially generated information feed on second screen as a TV show companion," Proceedings of the 10th European Conference on Interactive TV and Video (EuroITV '12), Jul. 2012.(ACM, New York, NY, USA), pp. 87-96.

(Continued)

*Primary Examiner* — Phuoc Nguyen  
*Assistant Examiner* — Davoud Zand  
(74) *Attorney, Agent, or Firm* — Thomas A. Ward

(57) ABSTRACT

Disclosed are methods and apparatus for processing social media posts. The methods may include certain multimedia content being identified as multimedia content for which social media posts relating to a broadcast of that multimedia content are to be stored. Using this identifying information, one or more filtering criteria may be provided for use by a filtering module. The filtering module may receive (e.g., from a social networking service) a stream of social media posts, filter the received stream to extract social media posts that relate to the broadcast of the certain multimedia content, and stores the extracted social media posts. Alternatively, a storage module may store the stream of social media posts, and a filtering module may filter the stored social media posts to identify social media posts that relate to the broadcast of the certain multimedia content.

24 Claims, 6 Drawing Sheets

(56) References Cited

U.S. PATENT DOCUMENTS

| | | | |
|---|---|---|---|
| 7,050,603 | B2 | 5/2006 | Rhoads et al. |
| 7,058,891 | B2 | 6/2006 | O'Neal et al. |
| 7,477,268 | B2 | 1/2009 | Venolia |
| 7,739,304 | B2 | 6/2010 | Naaman et al. |
| 7,813,557 | B1 | 10/2010 | Bourdev |
| 7,813,715 | B2 | 10/2010 | McKillop et al. |
| 7,836,044 | B2 | 11/2010 | Kamvar et al. |
| 7,873,982 | B2 | 1/2011 | Smith et al. |
| 7,934,233 | B2 | 4/2011 | Zimmerman et al. |
| 7,944,445 | B1 | 5/2011 | Schorr et al. |
| 7,956,847 | B2 | 6/2011 | Christie |
| 8,006,274 | B2 | 8/2011 | Scott, III |
| 8,612,534 | B1 * | 12/2013 | Hossack .................. 709/206 |
| 2002/0112247 | A1 | 8/2002 | Horner et al. |
| 2003/0182663 | A1 | 9/2003 | Gudorf et al. |
| 2004/0098754 | A1 | 5/2004 | Vella et al. |
| 2008/0294694 | A1 | 11/2008 | Maghfourian et al. |
| 2009/0048904 | A1 | 2/2009 | Newton et al. |
| 2009/0083781 | A1 | 3/2009 | Yang et al. |
| 2009/0154893 | A1 | 6/2009 | Vasudevan et al. |
| 2009/0183220 | A1 | 7/2009 | Amento et al. |
| 2009/0192896 | A1 | 7/2009 | Newton et al. |
| 2009/0238460 | A1 | 9/2009 | Funayama et al. |
| 2009/0281851 | A1 | 11/2009 | Newton et al. |
| 2009/0282087 | A1 | 11/2009 | Muller et al. |
| 2010/0082727 | A1 | 4/2010 | Zalewski |
| 2010/0169786 | A1 | 7/2010 | O'Brien et al. |
| 2010/0185984 | A1 | 7/2010 | Wright et al. |
| 2011/0021251 | A1 | 1/2011 | Lindén |
| 2011/0040760 | A1 | 2/2011 | Fleischman et al. |
| 2011/0041080 | A1 * | 2/2011 | Fleischman et al. ........ 715/751 |
| 2011/0063503 | A1 | 3/2011 | Brand et al. |
| 2011/0099490 | A1 | 4/2011 | Barraclough et al. |
| 2011/0107369 | A1 | 5/2011 | O'Brien et al. |
| 2011/0113440 | A1 | 5/2011 | Roberts et al. |
| 2011/0218656 | A1 | 9/2011 | Bishop et al. |
| 2012/0159527 | A1 | 6/2012 | Perez et al. |
| 2012/0215903 | A1 * | 8/2012 | Fleischman et al. ........ 709/224 |
| 2013/0287365 | A1 | 10/2013 | Basapur et al. |
| 2013/0290488 | A1 | 10/2013 | Mandalia et al. |
| 2013/0290859 | A1 | 10/2013 | Venkitaraman et al. |
| 2013/0290892 | A1 | 10/2013 | Basapur et al. |
| 2013/0297706 | A1 * | 11/2013 | Arme et al. ................ 709/206 |
| 2013/0346414 | A1 | 12/2013 | Smith et al. |
| 2014/0019539 | A1 | 1/2014 | Novak et al. |
| 2014/0089967 | A1 | 3/2014 | Mandalia et al. |
| 2014/0095608 | A1 | 4/2014 | Mandalia et al. |
| 2014/0101244 | A1 * | 4/2014 | Klein et al. ................ 709/204 |
| 2014/0181197 | A1 * | 6/2014 | Baggott ...................... 709/204 |
| 2014/0214980 | A1 * | 7/2014 | Jung .......................... 709/206 |

OTHER PUBLICATIONS

S. Basapur, et al., "Field trial of a dual device user experience for iTV," Proceedings of the 9th International Interactive Conference on Interactive Television (EuroITV '11), Jun.-Jul. 2011 (ACM, New York, NY, USA), pp. 127-135.

S. Zhao, et al., "SportSense: real-time detection of NFL game events from Twitter," Technical Report TR0511-2012, Rice University and Motorola Mobility, May 2012.

S. Zhao, et al., "Human as real-time sensors of social and physical events: a case study of Twitter and sports games" Technical Report TR0620-2011, Rice University and Motorola Mobility, Jun. 2011.

S. Zhao, et al., "Analyzing Twitter for Social TV: Sentiment Extraction for Sports" FutureTV workshop, Jun. 2011.

V. Savov, "Motorola's SocialTV app will turn your Xoom or Atrix into a communicative couch companion", Engadget, Apr. 7, 2011.

"Motorola Mobility Blends Community and Entertainment with Launch of SocialTV Companion Service for Tablets and Mobile Devices", MMI Social TV Press Release, Apr. 7, 2011.

D. Reisinger, "Motorola Mobility intros SocialTV service", CNET News, Apr. 8, 2011.

"SocialTV Companion Service: Second Screen Experience Blending Community and Entertainment", Motorola Mobility, 2011.

"SocialTV Experience", Media Experiences 2 Go, Apr. 7, 2011.

C. Horn, "Analysis and Classification of Twitter Messages", Master's Thesis at Graz University of Technology, Apr. 29, 2010.

J. Roettgers, "Chill brings live chat to Hulu's catchup TV", Online Video News, Nov. 16, 2011.

J. Roettgers, "Scoop: The Boxee Box is getting a live TV tuner", Online Video News, Nov. 8, 2011.

B. Parr, "SocialTV: Watch Hulu with Your Facebook and MySpace Friends", Apr. 28, 2009.

PCT Search Report & Written Opinion, RE: Application #PCT/US2014/022872; dated Jun. 25, 2014.

C. Barnes, et al. "Video Tapestries with Continuous Temporal Zoom", In ACM Transactions on Graphics (Proc. SIGGRAPH). 29(3), Aug. 2010, all pages.

S. Pongnumkul, et al. "Content-Aware Dynamic Timeline for Video Browsing", ACM Symposium on User Interface Software and Technology (UIST), Feb. 1, 2010, all pages.

M. Kipp, "ANVIL: The Video Annotation Research Tool", in J. Durand, U. Gut, G. Kristofferson (Hrsg.) Handbook of Corpus Phonology, Oxford University Press. Pre-print version, archived Oct. 18, 2012. URL: web.archive.org/web/20121018115513/http://embots.dfki.de/doc/Kipp%20HCP%20preprint.pdf.

M. Kipp, "Multimedia Annotation, Querying and Analysis in ANVIL", in M. Maybury (ed.), Multimedia Information Extraction, Chapter 19, Wiley—IEEE Computer Society Press. Pre-print version, archived Aug. 13, 2013. URL: web. archive.org/web/20130813035304/http://embots.dfki.de/doc/Kipp%20MMIE%20preprint.pdf.

A. Heloir, et al., "Exploiting Motion Capture for Virtual Human Animation: Data Collection and Annotation Visualization", in Proc. of the LREC Workshop on Multimodal Corpora: Advances in Capturing, Coding and Analyzing Multimodality, ELDA (2010). URL: michaelkipp.de/publication/Heloiretal10.pdf.

M. Kipp, "Spatiotemporal Coding in ANVIL," Proceedings of the 6th international conference on Language Resources and Evaluation (LREC). 2008. URL: http://embots.dfki.de/doc/Kipp08_Anvil.pdf.

M. Kipp, "Gesture Generation by Imitation—From Human Behavior to Computer Character Animation", PhD Thesis, Saarland University. Dec. 2003. URL: http://scidok.sulb.uni-saarland.de/volltexte/2007/1256/pdf/Dissertation_6189_Kipp_Mich_2003.pdf.

M. Kipp, "Anvil—A Generic Annotation Tool for Multimodal Dialogue", Proceedings of the 7th European Conference on Speech Communication and Technology (Eurospeech), 2001, pp. 1367-1370. URL: www.dfki.de/~kipp/public_archive/kipp2001-eurospeech.pdf.

"Timeline Basics", Simile Widgets Documentation Wiki. Simile-widgets.org. Dated Aug. 28, 2009. URL: simile-widgets.org/wiki/Timeline_Basics.

* cited by examiner

PROCESSING OF SOCIAL MEDIA FOR SELECTED TIME-SHIFTED MULTIMEDIA CONTENT

The present application claims priority from U.S. Provisional Application No. 61/802,076, filed Mar. 15, 2013, the entire disclosure of which is incorporated herein by reference. The present application is also related to application Ser. No. 13/855,686, filed Mar. 16, 2013.

FIELD

The present application relates to the processing of social media posts.

BACKGROUND

A consumer may record broadcast multimedia content so that they may view that multimedia content at some later time after the original broadcast. For example, a consumer may, such as by using a home or network-based digital video recorder (DVR), cause a device to record or otherwise store a television program so that the consumer may view that television program at some later time ("time shifting").

Also, while consuming multimedia content (e.g., while watching a broadcast television program), many consumers use social networking services to view social media related to that multimedia content.

Many providers of multimedia content are able to re-broadcast or otherwise provide multimedia content at some later time after an original broadcast of that multimedia content. For example, nationally or internationally important multimedia content, or culturally important multimedia (such as a "classic" sporting event), may be re-broadcast or streamed several years or decades after its original broadcast, or may be made available on an on-demand basis. Recorded multimedia content may also be made available to consumers as tangible recordings, such as DVDs.

DETAILED DESCRIPTION

Figure 1:
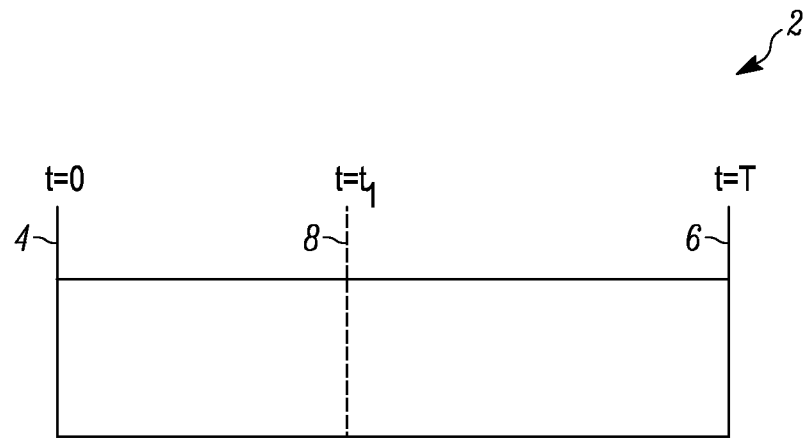
FIG. 1 is a schematic illustration (not to scale) showing an example of a TV program for use in accordance with an embodiment.

A consumer may be presented with social media that relates to multimedia content that the consumer has not yet consumed, but that the consumer intends to consume at a later time, e.g., on a time-shifted basis. The term "time shifting" encompasses delays of any length of time prior to time-shifted viewing. For example, time shifting can include short delays, such as those caused by purposefully pausing live content during a broadcast, such that the live content will be briefly buffered or otherwise recorded in a DVR prior to time-shifted viewing. The term "time shifting" can also encompass delays of hours, days, or years prior to time-shifted viewing. As a result of time shifting, such social media may contain "spoilers" or other information that may, if the consumer were to be privy to that information, have a detrimental effect upon the consumer's enjoyment of the multimedia content. For example, a consumer may record a television program that they intend to watch later. However, the consumer may still be exposed to social media posts that may contain information (e.g., spoilers) about that television program. Such consumers may desire to remove information relating to certain multimedia content from social media. Accordingly, content providers (including, for example, creators and distributors of multimedia content, cable and broadband service providers, multiple system operators (MSOs), and other types of service providers associated with the multimedia content) may desire to enable a consumer to continue using social networking services while not being exposed to social media that relates to certain multimedia content.

Providing, to consumers of a multimedia content, social media that has been created or published by consumers of one or more earlier broadcasts of that multimedia content, may enhance the viewing experience of the consumers. Also, it may be beneficial to provide storage (e.g., long-term storage), filtering, and/or indexing of social media posts relating to certain multimedia broadcasts. In some cases, it may be beneficial to store social media posts relating to certain multimedia broadcasts for posterity.

As used herein with respect to social media posts, a "stream" or "streaming" of social media posts should not be understood to limit the transmitting, receiving, or storing of social media posts to a particular protocol, interface, or standard. "Streaming" of social media posts, in various embodiments, can encompass any way of sending or receiving social media posts on a network, e.g., without regard to any particular method for delivering, requesting, sending, or retrieving such posts, and without regard to whether or not such posts are provided contemporaneously, or in any particular order, flow, or sequence of posts. A "stream" of social media posts, in some embodiments, can include any set, group, or collection of one or more social media posts, e.g., without regard to any particular method or protocol by which such posts are streamed or stored.

As used herein, a "publisher" means a source of one or more social media posts on a social networking service; for example, an identified or identifiable writer, publisher, distributor, redistributor, or social networking user who posts or reposts social media posts. In an embodiment, a social networking user is able to be a publisher, and therefore, a publisher is a more specific category within the general category of social networking users. Conventionally, each user is associated with user information, which includes a unique user identifier (or userid) for use in a social networking service. A publisher's user identifier is useful for other users, who wish to identify social media posts by the publisher, which may be indexed by or retrievable by the publisher's user identifier. A user's user information also can include one or more affinities of the user; e.g., the user may choose to publicly share an affinity for a particular sports team, city, celebrity, or other subject. An affinity can be positive, negative, or expressed in any of numerous ways of indicating or ranking an interest in, or a liking or disliking of, the subject of the affinity.

As used herein, a "social connection list" means a list, table, or other data that identifies one or more additional users (or groups of users) associated with the user; for example, user-selected "friends," connections, contacts, publishers followed, publishers subscribed to, users in a social networking circle, users in a social networking group or subgroup, or other selected individuals, entities, or groups. A user of a social networking service is conventionally able to have at least one user-specific social connection list for the social networking service. Social connection lists enable a user to select or identify other users whose posts are of interest to the user. In some embodiments, a stream of social networking posts received by a given user is limited by the social networking service prior to processing by the filtering module, e.g., limited to publishers in a social connection list of the user.

Embodiments include methods of, and apparatus for, processing social media posts. The methods include a filtering module configured to receive (e.g., from a social networking service) a stream that includes one or more social media posts. The filtering module is able to acquire one or more filtering criteria (which can, for example, include one or more identifiers, such as a keyword or hashtag, which are usable to identify a social media post as relating to certain multimedia content). In a first embodiment, the filtering module, using the acquired filtering criteria, is able to filter the received stream to extract, from the stream, those social media posts that relate to the certain multimedia content.

In another embodiment, the filtering module is able to use a first portion of the one or more filtering criteria to request and receive a filtered stream of one or more social media posts; for example, the first portion may include criteria for limiting the social media posts to those posted by desired or specified sources or publishers.

In a further embodiment, the filtering module is able to apply a second portion of the one or more filtering criteria to the received stream of social media posts, for extracting only those social media posts conforming to all of the one or more filtering criteria.

Without providing the extracted social media posts for playback at a current time on a playback device, an embodiment of the filtering module is then able to store (e.g., within a database) the extracted social media posts for future provision to the playback device.

Further embodiments include further methods of, and apparatus for, processing social media posts. The further methods include certain multimedia content being identified (e.g., by a provider, maker or broadcaster of that multimedia content, or by a provider of a social networking service, or by any other party) as multimedia content for which social media posts relating to a broadcast of that multimedia content are to be stored. Using this identifying information, one or more filtering criteria are provided (e.g., specified, generated, or determined) for use by a filtering module.

In some embodiments, the filtering module receives (e.g., from a social networking service) a stream including a plurality of social media posts that have been published concurrently with a presentation (e.g., a broadcast, a unicast, a multicast, etc.) of certain multimedia content, filters the received stream (using the filtering criteria) to extract social media posts that relate to the broadcast of the certain multimedia content, and stores (e.g., in a database) the extracted social media posts. In other embodiments, a storage module stores the stream of social media posts, and a filtering module then filters the stored social media posts (using the filtering criteria) to identify (e.g., extract) social media posts that relate to the broadcast of the certain multimedia content.

In further embodiments, the filtering module also receives (e.g., from a social networking service) a further stream including a plurality of social media posts that have been published by a user while that user is consuming the certain multimedia content on a time-shifted basis with respect to the earlier presentation of the multimedia content. The filtering module then filters the received further stream (using the filtering criteria) to extract social media posts that relate to the broadcast of the certain multimedia content, and stores (e.g., in the database) the extracted social media posts.

In some of the foregoing embodiments, instead of or in addition to storing the extracted social media posts, the filtering module is able to store indicia (such as Universal Resource Locators (URLs), pointers, or other identifiers) corresponding to the extracted social media posts, for enabling future retrieval and presentation of the extracted social media posts, e.g., from a network-accessible storage device, database, server, or archive. In further embodiments, instead of or in addition to storing the extracted social media posts, the filtering module is able to store some function (e.g. a hash) of the extracted social media posts (or information that may be used to identify the extracted social media posts, such as a time reference and composer information) for enabling the distinguishing of the extracted social media posts from other social media posts (e.g. in a replayed or played back stream of social media posts received from a social networking service).

The following description is based on embodiments of the invention and should not be taken as limiting the invention with regard to alternative embodiments that are not explicitly described herein.

Apparatus for implementing any of the below described arrangements, and performing any of the below described method steps, can be provided by configuring or adapting any suitable apparatus, for example, one or more computers or other processing apparatus or processors, and/or providing additional modules. The apparatus can, for example, include a computer, a network of computers, or one or more processors, for implementing instructions and using data, including instructions and data in the form of a computer program or plurality of computer programs stored in or on a machine readable storage medium such as computer memory, a computer disk, ROM, magnetic or optical media, solid state media, etc., or any combination of these or other storage media.

It should be noted that certain of the process steps depicted in the below described process flowcharts (i.e., FIGS. 4 to 7) may be omitted or such process steps may be performed in differing order to that presented below and shown in those process flowcharts. Furthermore, although all the process steps have, for convenience and ease of understanding, been depicted as discrete temporally-sequential steps, nevertheless some of the process steps may in fact be performed simultaneously or at least overlapping to some extent temporally.

Referring now to the Figures, FIG. 1 is a schematic illustration (not to scale) showing a television (TV) program 2. The TV program 2 is used herein to illustrate embodiments of a method of processing social media posts. Embodiments of such processes will be described in more detail later below with reference to FIGS. 4 to 7. Examples of the TV program 2 include an item or segment of multimedia content encoded for broadcast, multicast, unicast, streaming, or storage, e.g., as analog and/or digital video data (encoded, for example, in an MPEG-2, DVB, MPEG-4, AVC/H.265, HEVC/H.265, or other type of program stream or bit stream, or otherwise digitally encoded).

The TV program 2 may be consumable by a consumer using any appropriate playback device for rendering multimedia content (e.g., a set-top box, media player, desktop or laptop computer, a tablet computer, smartphone, or other mobile device, or a display device such as a monitor or television). The TV program 2, in the depicted example, runs from its start time 4 at time t=0 to its end time 6 at time t=T.

It will be appreciated that in other embodiments that processing social media posts may be implemented with a different type of media presentation/multimedia content (e.g., a movie, a radio broadcast etc.) instead of or in addition to the TV program 2. The media presentation may also include a multi-device presentation, i.e., a multimedia presentation to be shown on more than one different device. For example, the media presentation may include a video presentation to be shown on a first device, and a supplemental presentation (e.g., additional textual and/or graphical information or interactive features) to be shown on a second device. The TV program 2 may be of any genre, for example, a history documentary, a news broadcast, an entertainment program, a sports program, etc.

Although the illustrative example of the TV program 2 is depicted as running from its start time 4 (at time t=0) to its end time 6 (at time t=T), it will be understood that the running time of TV program 2 may, in practice, be interrupted by breaks, such as for advertisements, public service announcements, and the like. For example, one embodiment of TV program 2 may include no commercial breaks or advertising segments. A further embodiment of TV program 2 may include advertising segments, or splice points or other indicators for ad insertion, without including any portion of time allocated for such segments as part of the running time of TV program 2. Further embodiments of the TV program 2 may include commercial breaks within its running time; for example, a historical TV program 2 may include pre-recorded advertising segments (e.g., advertisements that were contemporaneously recorded during a broadcast of the TV program 2). Accordingly, in some cases, the breaks may be included in the running time of TV program 2. Such breaks, advertising segments, and similar material are to be appropriately taken into account when determining a temporal identifier that corresponds to a specified point (t) during the TV program 2. Non-limiting examples of a temporal identifier include a time indicator identifying an absolute or relative date and time, an ISO 8601 representation, a timestamp using Coordinated Universal Time (UTC), or other time indicator identifying an offset from a known time such as the start time 4 of TV program 2. It will be understood that various kinds of information (e.g., embedded metadata, third-party metadata) for enabling determination of an appropriate temporal identifier are known in the art.

A point in the TV program 2 (hereinafter referred to as the "point" and shown in FIG. 1 as a dotted line within the TV program 2 and indicated by the reference numeral 8) occurs at a time within the TV program 2, i.e., at time $t=t_1$ where $t_1$ may be any time point in the TV program 2 between t=0 and t=T. The point 8 may be any point in the TV program 2 in relation to which a user of a social networking service may create or publish a social media post. For example, the point 8 may be the start or end of a certain scene within the TV program 2, or the point 8 may be at, or proximate to, a point within the TV program 2 at which an event occurs (e.g., if the TV program 2 is an athletics program, the point 8 may be at or proximate to the end of an athletics event within that show, e.g., where a user of a social networking service may comment about the results of that event).

Figure 2:
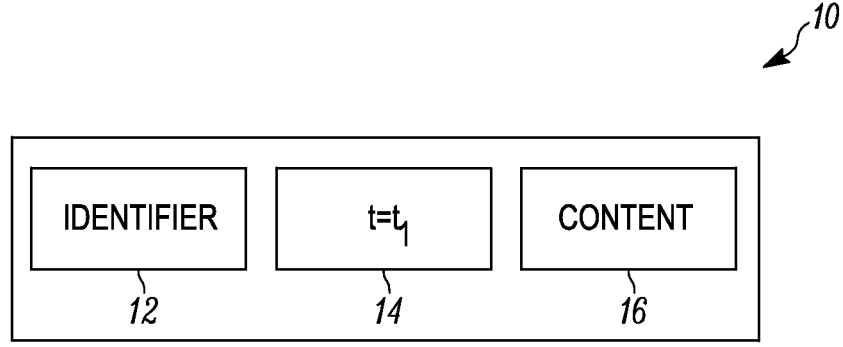
FIG. 2 is a schematic illustration showing an example of a social media post for use in accordance with an embodiment.

FIG. 2 is a schematic illustration showing a social media post 10. The social media post 10 is used herein to illustrate embodiments of a method of processing social media posts.

The social media post 10 may be any appropriate type of social media post created or published by a publisher or a user of any type of social networking service, or otherwise posted or reposted using that service. For example, the social media post 10 may be a Twitter post, or "tweet", made using the Twitter social networking service. Also, for example, the social media post 10 may be a Google+ post made using the Google+ social networking service. Also, for example, the social media post 10 may be a Facebook post, e.g., a Facebook status update, made using the Facebook social networking service. The foregoing well-known examples are provided for illustrative purposes, and social media posts 10 are in no way limited to or by those examples.

The social media post 10 is published, e.g., by a user of a social networking service, in relation to the point 8 within the TV program 2. In other embodiments, the social media post 10 is published in relation to one or more different points or ranges within the TV program 2 instead of, or in addition to, the point 8.

The social media post 10 includes an identifier 12, a time indicator 14, and content 16. In some embodiments, the post 10 includes a plurality of instances of identifier 12.

An identifier 12 can comprise any kind or collection of metadata that describes the social media post 10. For example, in an embodiment, an identifier 12 comprises a unique identifier for the social media post 10 within an associated namespace; e.g., a unique identifier that can be used for looking up or otherwise referencing or locating the social media post 10, and that can accordingly be used to associate the social media post 10 with other post-specific metadata or information. In further embodiments, the identifier 12 can comprise any kind or collection of metadata that can be used, e.g., by browsing or searching for the identifier 12, to find, detect and/or extract the social media post 10 from a stream, database, or other local or remote collection of social media posts.

In some embodiments, the identifier 12 includes post-specific metadata (or can be used to associate the post 10 with post-specific metadata) that identifies, and/or can be used to identify, the publisher of the social media post 10.

In further embodiments, the identifier 12 includes post-specific metadata (or can be used to associate the post 10 with post-specific metadata) that identifies, and/or can be used to identify, the social media post 10 as relating to one or more subjects, topics, or entities. For example, the identifier 12 may include metadata that identifies the social media post 10 as relating to the TV program 2 or, e.g., as specifically relating to the point 8 within the TV program 2. The identifier may be, but is not limited to being, a tag, a keyword or term (e.g., a non-hierarchical keyword or term), or a hashtag.

The identifier 12 of the social media post 10 can be created or specified by any appropriate process, e.g., the identifier 12 may be specified by a creator or publisher of the social media post 10, or the identifier 12 may be generated automatically by one or more processors. In some embodiments, the identifier 12 is editable, for example, by a creator or publisher of the social media post 10. In some embodiments, a social media post 10 includes one or more instances of identifier 12; e.g., a plurality of identifiers that, for example, identify the social media post as relating to a plurality of different subjects, topics, or entities.

The time indicator 14 is post-specific metadata that specifies time information relating to the social media post 10. In some embodiments, time indicator 14 is included in the social media post 10; in other embodiments, the identifier 12 can be used to look up or otherwise determine a time indicator 14 associated with post 10. This time information can include, for example, a time and date at which the social media post 10 was published. The time information can also, in an illustrative example, include a time relative to multimedia content to which the social media post 10 relates. For example, if the social media post relates to the point 8 within the TV program 2, the time indicator 14 specifies the time, within the TV program 2, of the point 8 (i.e., $t=t_1$). The time indicator 14 of the social media post 10 can be created or specified by any appropriate process, e.g., the time indicator 14 can be specified by a creator or publisher of the social media post 10, or be generated automatically by one or more processors. In some embodiments, the time indicator 14 is editable, for example, by a creator of the social media post 10.

The content 16 of the social media post 10 includes information specified by the publisher or creator of the social media post 10, that is to be consumed by (e.g., displayed to) a consumer of the social media post 10. In a simplified embodiment, the content 16 is text (e.g., a string of ASCII text), and is generally limited in length or size. In some embodiments, one or more instances of an identifier 12 may be included within the content 16; for example, an identifier 12 can be a keyword, term, or hashtag that is included within the text of content 16. In further embodiments, the content 16 can include, for example, one or more instances of various types of content, such as text, an audio recording, a video, an image or picture, a hypertext link, etc. In an embodiment, the subjects, topics, or entities to which the content 16 relates are those that are specified by the identifier 12. For example, the content 16 of the social media post 10 may relate to the TV program 2 (e.g., the content 16 may be text that the publisher or creator of the social media post 10 writes in response to viewing the TV program 2), and the identifier of that social media post 10 may specify the TV program 2. Furthermore, the time indicator 14 may include time information for the content 16. For example, the content 16 may relate to the point 8 within the TV program 2, and the time indicator 14 may specify the time (i.e., $t=t_1$) within the TV program 2 of the point 8.

The social media post 10 may be consumable by a consumer using any appropriate client device (e.g., media player, desktop or laptop computer, a tablet computer, smartphone, or other mobile device, or a display device such as a monitor or television). Some or all of the content 16 of the social media post 10 may be created or specified by any appropriate process, e.g., the content 16 may be specified by a creator or publisher of the social media post 10, or a portion of the content 16 may be generated automatically by one or more processors. In some embodiments, the content 16 is editable, for example, by a creator or publisher of the social media post 10.

Figure 3:
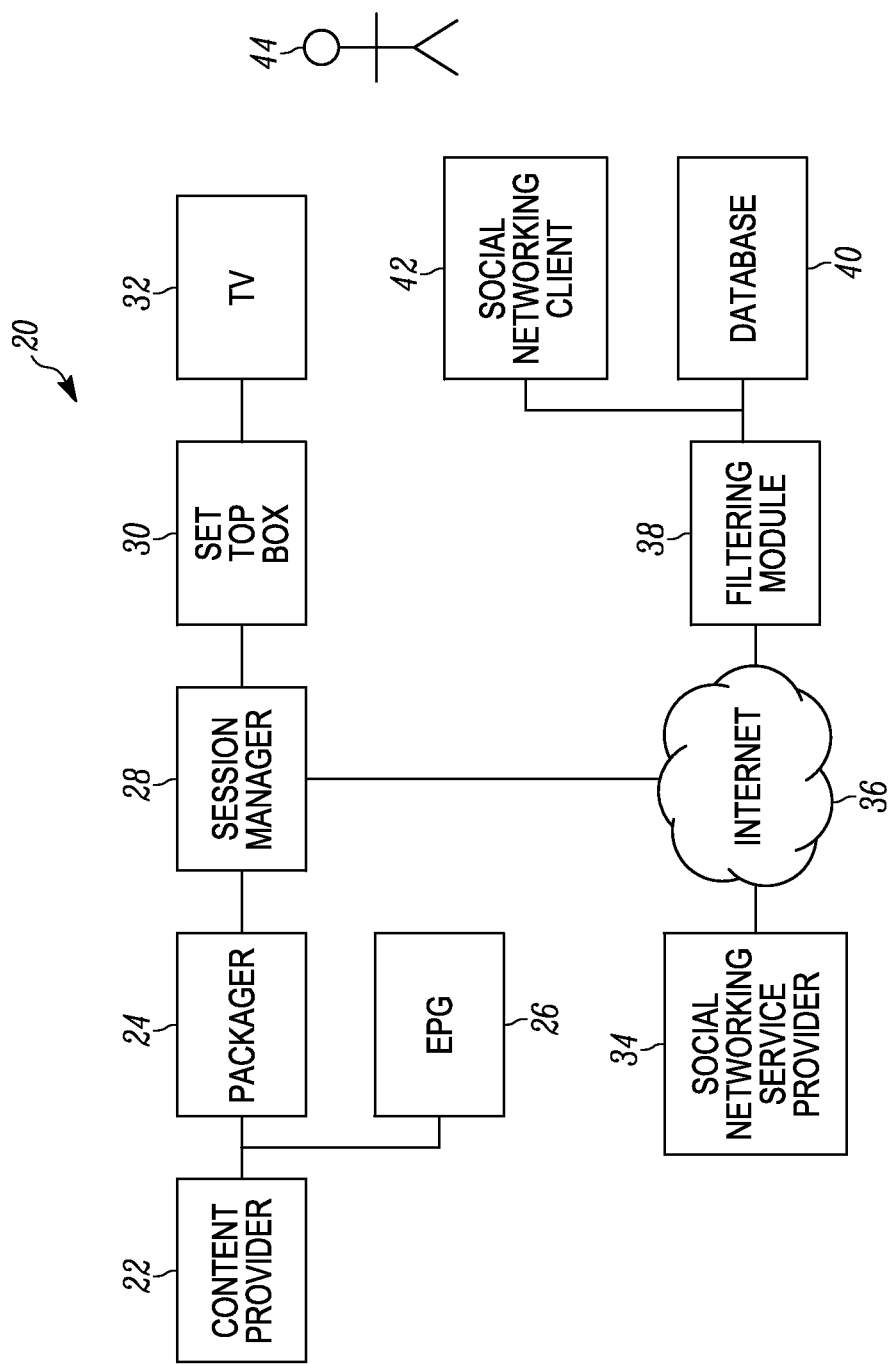
FIG. 3 is a schematic illustration of an example of a multimedia content distribution network for use in accordance with an embodiment.

FIG. 3 is a schematic illustration of an example network 20. Embodiments of methods for processing social media posts 10, as may be performed by the entities of the network 20, are described in more detail later below with reference to FIGS. 4 to 7.

The representative network 20 includes a content provider 22, a packager 24, an electronic program guide (EPG) 26, a session manager 28, a set-top box 30, a television (TV) 32, a social networking service provider 34, the Internet 36, a filtering module 38, a database 40, a social networking client 42, and a user 44.

The content provider 22 includes apparatus that provides a television feed in which the TV program 2 is encoded. In the example network 20, the content provider 22 is coupled to each of the packager 24 and the EPG 26 (e.g., either by a wireless or wired connection) such that, in operation, the content provider 22 is able to provide the television feed to each of the packager 24 and the EPG 26.

The packager 24 is a facility/apparatus for receiving, processing, and re-distributing television signals (e.g., the television feed received from the content provider 22). Further functionality of the packager 24 is described in more detail later below with reference to FIGS. 4 to 7. In the example network 20, in addition to being coupled to the content provider 22, the packager 24 is coupled (e.g., either by a wireless or wired connection) to the EPG 26 (such that information stored by the EPG 26 can be accessed by the packager 24) and the session manager 28 (such that information can be sent from the packager 24 to the session manager 28 and vice versa). In operation, the packager 24 receives a television feed (in which the TV program 2 is encoded) from the content provider 2. The packager 24 processes the received television feed, and distributes the processed feed (e.g., encoded in an appropriate multimedia container) to the session manager 28.

The EPG 26 is a provider of broadcast programming or scheduling information for current and upcoming TV programs.

The session manager 28 is a facility/apparatus for receiving, processing, and re-distributing information sent to it by the packager 24. The session manager 28 may, for example, record or delay processed feeds sent to it by the packager 24. The functionality of the session manger 28 is described in more detail later below with reference to FIGS. 4 to 7. In addition to being coupled to the packager 24, the session manager 28 is coupled (e.g., either by a wireless or wired connection) to the set-top box 30 such that information can be sent from the session manager 28 to the set-top box 30 and vice versa. Also, in the example network 20, the session manager 28 is coupled, via the Internet 36, to the filtering module 38 such that information can be sent (e.g., as an email, an SMS message, or as a social media post) between the session manager 28 and the filtering module 38, e.g., as described in more detail later below with reference to FIGS. 4 to 7. In some embodiments, the session manager 28 is coupled to the filtering module 38 by different means.

The set-top box 30 is a device that, in operation, processes a multimedia container received from the session manager 28 to provide content for presentation by the TV 32. In addition to being coupled to the session manager 28, the set-top box 30 is coupled (e.g., either by a wireless or wired connection) to the TV 32 such that information may be sent from the set-top box 30 to the TV 32 and vice versa.

The TV 32 is a device that, in operation, presents (e.g., displays) media content (e.g., the TV program 2) received from the set-top box 30 to the user 44. Also, the TV 32 is configured to transmit a user input received by the TV 32 from the user 44 to the set-top box 30.

In other embodiments, a different type of device replaces the TV 32 (and/or the set-top box 30) or is used in addition to the TV 32 and/or the set-top box 30. Suitable devices include, but are not limited to, a desktop personal computer, a laptop computer, a tablet computer, a mobile station, an entertainment appliance, a wireless phone, a smartphone, a netbook, a game console, etc.

The social networking service provider 34 is a provider of a social networking service. The networking service provider 34 provides an online service (e.g., a website, an application, an application programming interface, etc.) that enables or facilitates users of the social networking service 34 to, for example, create a social connection list, which can be useful for building or enhancing social networks or social relations with people who, for example, share common interests, activities, backgrounds, or real-life connections. Well-known illustrative examples of a social networking service provider 34 include Twitter, Google+, and Facebook; however, social networking service providers 34 are in no way limited to or by the foregoing examples. In the example network 20, the social networking service provider 34 is connected, via the Internet 36, to the filtering module 38 such that social media posts 10 that have been created or published by users of the social networking service, are provided, by the social networking service provider 34, to the filtering module 38.

In some embodiments, there are a plurality of different social networking service providers that may, for example, each supply a respective stream of social media posts 10 to the filtering module 38.

The filtering module 38 is a facility/apparatus for receiving, processing, and re-distributing social media posts 10 sent to it from the social networking service provider 34. The functionality of the filtering module 38 is described in more detail later below with reference to FIGS. 4 to 7. In some embodiments, the filtering module 38 is configured to extract certain social media posts from a feed of social media posts received by it from social networking service provider 34 in accordance with one or more filtering criteria acquired (e.g., received or generated) by the filtering module 34.

In addition to being coupled to the social networking service provider 34, in the example network 20, the filtering module 38 is coupled (via the Internet 36) to the session manager 28 such that information sent by the session manager is received by the filtering module 38.

Also, in the example network 20, the filtering module 38 is coupled (e.g., either by a wireless or wired connection) to the database 40. This coupling is such that, in use, data relating to social media posts 10 that have been extracted from a stream of such posts is sent, from the filtering module 38, to the database 40, for storage by the database 40.

In some embodiments, the data related to the extracted social media posts that is stored in the database 40 includes the content 16 of those social media posts and/or the time indicators 14 of those social media posts and/or the identifier 12 of those social media posts. In further embodiments, instead of or in addition to comprising the content 16 of the extracted social media posts, the data related to the extracted social media posts that is stored in the database 40 includes indicia corresponding to the extracted social media posts, for enabling future retrieval and presentation of the extracted social media posts, or includes information that may be used to identify social media posts that match the extracted social media posts and are within a stream of social media posts (e.g., a replayed or played back stream of social media posts, received by the filtering module 38), such that the identifying information can be used to identify a corresponding subset of one or more of the social media posts. Accordingly, the database 40 can, in various embodiments, be used to store extracted social media posts in their entirety, or to store their content 16, or to index the extracted social media posts so as to allow for future retrieval.

Furthermore, the coupling between the filtering module 38 and the database 40 is such that the information stored in the database 40 may be retrieved, from the database 40, by the filtering module 38.

Also, in the example network 20, the filtering module 38 is coupled (e.g., either by a wireless or wired connection) to the social networking client 42. This coupling is such that information (e.g., social media posts 10) can be sent, from the filtering module 38, to the social networking client 42, e.g., for presentation by the social networking client 42 to the user 44.

The social networking client 42 is a client module that corresponds to the social networking service provider 34 and is configured to be able to present (e.g., display), for consumption by the user 44, social media posts 10 created or published by users of the social networking service provided by the social networking service provider 34. The social networking client 42 may be, for example, a Twitter client, a Google+ client, or a Facebook client, or other type of software application configured to access data from the social networking service provider 34, e.g., by use of published or unpublished application programming interfaces or protocols. The social networking client 42 operates on a playback device such as a desktop personal computer, a laptop computer, a tablet computer, a mobile station, an entertainment appliance, a set-top box communicatively coupled to a television, a wireless phone, a smartphone, a netbook, a game console, etc.

The user 44 is a user and/or operator of the TV 32 and the social networking client 42. The user 44 is a user of the social networking service provided by the social networking provider 34.

In some embodiments, functionality provided by one or more of the entities in the example network 20 may be provided by an additional entity, or a different entity of the network 20. For example, in some embodiments, the functionality provided by the session manager 28 (and described in more detail later below with reference to FIGS. 4 to 7) is provided by the set-top box 30 and/or TV 32.

In some embodiments, the entities of the example network 20 are connected together in a different way to that described above.

In some embodiments, certain entities of the example network 20 are located in the same device, or provided by the same apparatus. For example, in some embodiments, the packager 24, the EPG 26, and the session manager 28, are provided by a common module, e.g., a cable head end. However, in other embodiments, one or more of the packager 24, the EPG 26, and the session manager 28 are provided by separate, different apparatus to the others. Also for example, in some embodiments, the filtering module 38, the database 40, and the social networking client 42 are provided by, or located on or in, a common apparatus or device, e.g., a playback device such as a desktop personal computer, a laptop computer, a tablet computer, a mobile station, an entertainment appliance, a set-top box communicatively coupled to a television, a wireless phone, a smartphone, a netbook, a game console, etc. However, in other embodiments, one or more of the filtering module 38, the database 40, and the social networking client 42 are provided by separate, different apparatus to the others.

Figure 4:
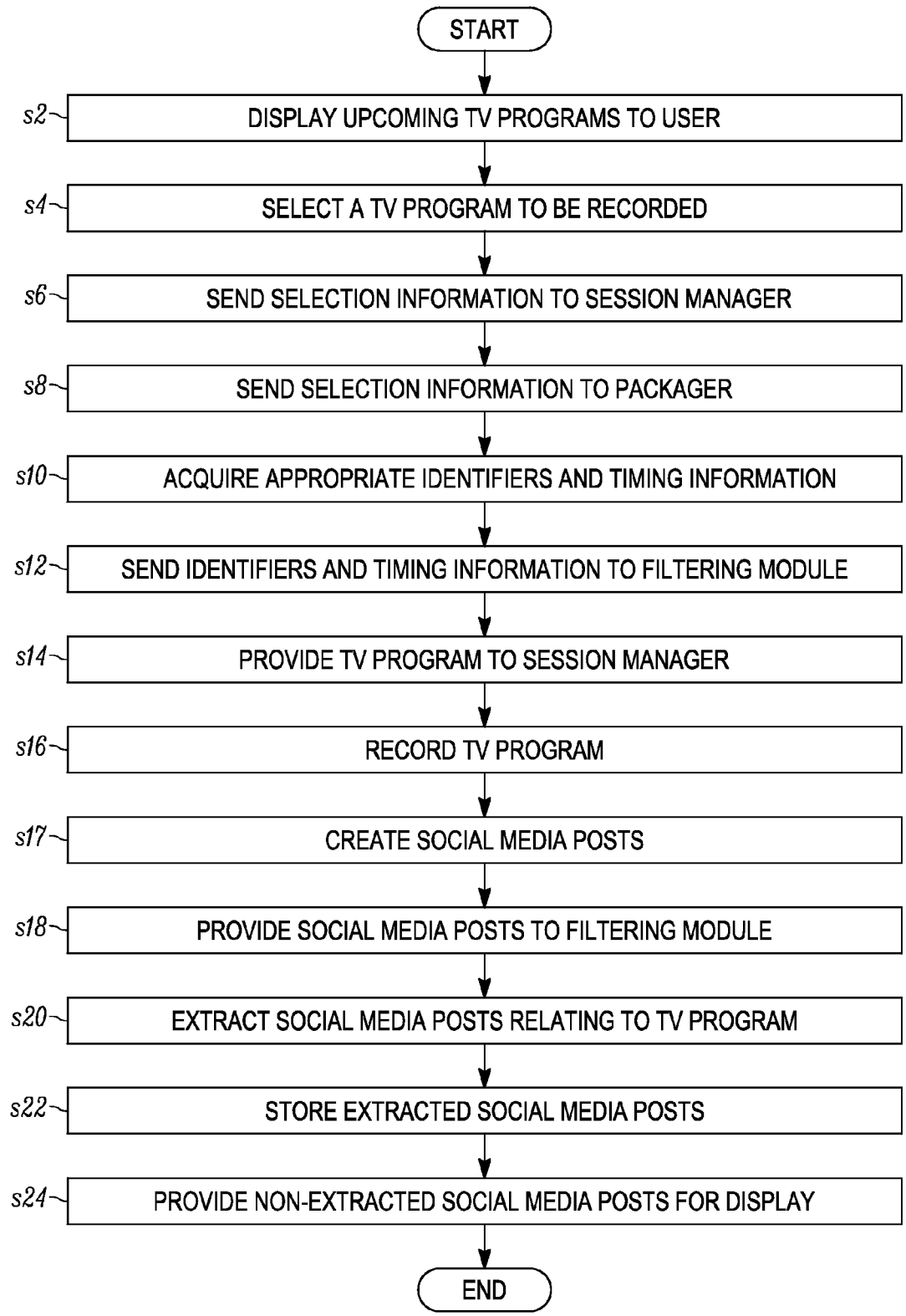
FIG. 4 is a process flow chart showing an example of a process of storing social media posts in accordance with an embodiment.

FIG. 4 is a process flow chart showing an embodiment of a method of processing social media posts 10 performed by the entities of the network 20. The process of FIG. 4 includes the extraction of social media posts 10 from a stream of social media posts 10.

At s2, broadcast programming or scheduling information for current and upcoming TV programs is displayed to the user 44, e.g., on the TV 32. This information may, for example, have been provided for display on the TV 32 by the EPG 26 (e.g., via the packager 24, the session manager 28, and the set-top box 30). Alternatively, the broadcast programming or scheduling information is displayed to the user 44 by a different module or device, e.g., the social networking client 42, or a web browser.

At s4, the user 44 selects the TV program 2 to be recorded so that the user 44 may watch the TV program 2 at some later time, which may be after the broadcast of the TV program 2. This selection of the TV program 2 for recording by the user 44 is performed using any appropriate mechanism. For example, the user 44 can select, using a controller of the TV 32, the TV program 2 from a list upcoming TV programs that is displayed on the TV 32.

At s6, an indication that the user 44 has selected the TV program 2 to be recorded, is sent to the session manager 28, e.g., from the TV 32 via the set-top box 30. This indication identifies the TV program 2, and specifies that the TV program 2 is to be recorded when it is provided by the content provider 22 (i.e., when the TV program 2 is provided for presentation i.e., for broadcast, unicast, multicast, etc.).

The indication received by the session manager 28 may include an instruction to the session manager 28 to record the TV program 2 when the TV program 2 is sent to the session manager 28 by the packager 24.

At s8, an indication that the user 44 has selected the TV program 2 to be recorded, is sent to the packager 24 from the session manager 28. This indication identifies the TV program 2 and specifies that the TV program 2 is to be recorded when it is broadcast.

At s10, the packager 24 acquires scheduling information for the TV program 2 from the EPG 26. This scheduling information may, for example, include the start time 4 and the end time 6 for the upcoming broadcast of the TV program 2.

Also at s10, in response to receiving the indication that the user 44 has selected the TV program 2 to be recorded, the packager 24 acquires one or more identifiers 12 that may identify, and/or be used to identify, a social media post 10 as relating to the TV program 2. For example, the packager 24 may acquire one or more tags, keywords, key-terms, or hashtags that relate to the TV program 2. The acquired identifiers 12 are metadata that enable, e.g., by browsing or searching a stream of social media posts 10, the finding or detection of (e.g., within that stream of social media posts) those social media posts 10 that relate to the TV program 2 or events occurring therein. Also, the acquired identifiers 12 are metadata that enable, e.g., by browsing or searching a stream of social media posts 10, the extracted, from that stream of social media posts, those social media posts 10 that relate to the TV program 2 or events occurring therein.

Any appropriate process may be used at s10 to acquire the one or more identifiers 12. For example, the packager 24 may retrieve the identifiers 12 from a database of such identifiers. Also for example, the packager 24 may acquire identifiers 12 from the maker of the TV program 2, or the provider of the TV program 2 (i.e., the content provider 22), after identifiers have been specified by the maker, or provider, of the TV program 2. Also for example, the packager 24 may acquire identifiers 12 from the social networking service provider 34. Also for example, identifiers may be manually specified (e.g., by an operator the packager 24), or automatically generated, for the packager 24 (e.g., by, in effect, predicting appropriate keywords, hashtags etc.). Also for example, the packager 24 may acquire identifiers 12 from the user 44.

Thus, at step s10 the filtering module 38 acquires one or more filtering criteria which specify media content (i.e., content-specific filtering criteria). In some embodiments, the filtering module 38 acquires a different type of content-specific filtering criteria instead of or in addition to identifiers 12 that may be used by the filtering module 38 to extract social media posts from the input stream.

At s12, the acquired scheduling information (or timing information) and identifiers 12 relating to the TV program 2 are sent from the packager 24 to the filtering module 38 (e.g., via the session manager 28 and the Internet 36). The filtering module 38 receives the timing information and identifiers 12 relating to the TV program 2.

At s14, the content provider 22 provides the TV program 2 for broadcast. The TV program 2 is provided to the session manager 28, e.g., via the packager 24 which may, for example, encode the TV program 2 in an appropriate multimedia container.

At s16, in response to having received the indication that the user 44 has selected the TV program 2 to be recorded, the session manager 28 records the received TV program 2. The TV program 2 is recorded such that, at a later time (e.g., sometime after the original broadcast of the TV program 2), the TV program 2 may be played back to the user 44. In other words, the TV program 2 is recorded such that the user 44 may consume the TV program 2 on a time-shifted basis with respect to the earlier or original presentation (e.g., broadcast, unicast, multicast etc.) of the TV program 2. Recording of the TV program 2 by the session manager 28 is performed using any appropriate process and apparatus. For example, the session manager 28 may record the received TV program 2 in a local memory.

Concurrently with the session manager 28 recording the TV program 2, the TV program 2 provided for display, and may be displayed (e.g., using further TVs) to consumers who are different to the user 44. For example, the TV program 2 may be consumed by other users of the social networking service provided by the social networking service provider 34.

At s17, concurrently with the presentation of the TV program 2, one or more users of the social networking service provided by the social networking service provider 34 that are consuming the TV program 2 create or publish social media posts 10 that relate to the TV program 2. An identifier 12 of such a social media post 10 indicates that that social media post 10 relates to the TV program 2. A time indicator 14 of such a social media post 10 indicates that that social media post 10 was published or created between the start time 4 and end time 6 of the TV program 2.

At s18, the social networking service provider 34 provides social media posts 10, as a stream of social media posts 10, to the filtering module 38. This stream of social media posts 10 includes social media posts 10 that relate to the TV program 2 (i.e., the social media posts 10 published or created at step s17). This stream of social media posts 10 may also include one or more social media posts 10 that do not relate to the TV program 2, and instead may relate to some other subject.

The stream of social media posts 10 received by the filtering module 38 at step s18 may have been received by the filtering module 38 in response to an initial set of filtering criteria (e.g., that may have been specified by the filtering module 38). These filtering criteria may specify certain users of the social networking service whose social media posts 10 are to be provided to the filtering module 38. These filtering criteria may be user-specific filtering criteria and not comprise content-specific filtering criteria. Thus, the stream of social media posts 10 received by the filtering module 38 at step s18 may be a user-specific input stream.

At s20, the filtering module 38 filters the received input stream of social media posts 10 so as to extract, from the received stream, those social media posts 10 that relate to the TV program 2.

In this embodiment, the extraction process of s20 is performed using the identifiers 12 relating to the TV program 2, sent to the filtering module 38 from the packager 24 at s12. For example, the filtering module 38 identifies those social media posts 10 in the stream of social media posts 10 whose identifier(s) 12 match one or more of the identifiers 12 received from the packager 24. In other words, the filtering module 38 filters the received stream of social media posts using the identifiers 12 received from the packager 24. The filtering module 38 then extracts, from the input stream, those social media posts 10 that include an identifier 12 that matches one or more of the identifiers 12 received from the packager 24.

In some embodiments, in addition to filtering dependent upon the identifiers received by the filtering module 38 from the packager 24, the extraction process performed by the filtering module at s20 may use the timing information relating to the TV program 2, sent to the filtering module 38 from the packager 24 at s12. For example, the filtering module 38 may only extract, from the input stream, those social media posts 10 whose time indicator 14 indicates that that social media post 10 corresponds to a time between the start time 4 and end time 6 of the TV program 2. In other words, the filtering module 38 may only extract, from the stream, those social media posts 10 that have been published during the presentation of the TV program 2.

Thus, at s20, social media posts that relate to the TV program 2, and have been created or published during the broadcast of the TV program 2, may be extracted from the stream of social media posts 10.

At s22, the social media posts 10 that have been extracted from the stream of social media posts 10, by the filtering module 38, are stored or indexed in the database 40. In other words, in an embodiment, the filtering module 38 sends the social media posts 10 extracted from the stream at s20 (or sends data related to the extracted social media posts 10), to the database 40 for storage or indexing.

The data stored in the database 40 for an extracted social media post is usable to ascertain a time reference (e.g., a time indicator 14) for that social media post, such that that social media posts can be provided for playback, by a playback device, synchronously with a playback by the user 44 of the TV program 2. For example, the data stored in the database 40 for an extracted social media post comprises a time reference for that social media post.

The data stored in the database 40 for an extracted social media post may be indicative of an opinion expressed in that social media post 10 (e.g., by the creator or publisher of the social media post 10). The opinion expressed in the social media post may relate to any subject, such as the TV program 2 or events occurring within the TV program 2. This "opinion information" may, for example, be based upon social voting tools (such as star ratings, or flags, or like buttons) that allow viewers to tag social media posts. Alternatively, this opinion information may be manually specified or specified by using AI-based natural language processing, or otherwise. As described in more detail later below with reference to FIG. 7, during playback of social media posts 10, the filtering module 38 may filter social media posts 10 depending on the opinion information such that only those social media posts whose opinion information satisfies certain criteria are presented to a user.

At s24, the social media posts 10 that have not been extracted from the stream of social media posts 10, by the filtering module 38, are sent to the social networking client 42. The social networking client 42 provides (e.g., displays) the received social media posts 10 for consumption by the user 44. At s24, those social media posts 10 that have been extracted from the stream by the filtering module 38 (i.e., those social media posts 10 that relate to the TV program 2), are, in this embodiment, not sent to the social networking client 42.

Thus, a method of processing social media posts 10 (which includes the extraction of social media posts 10 from a stream of social media posts 10) is provided.

Figure 5:
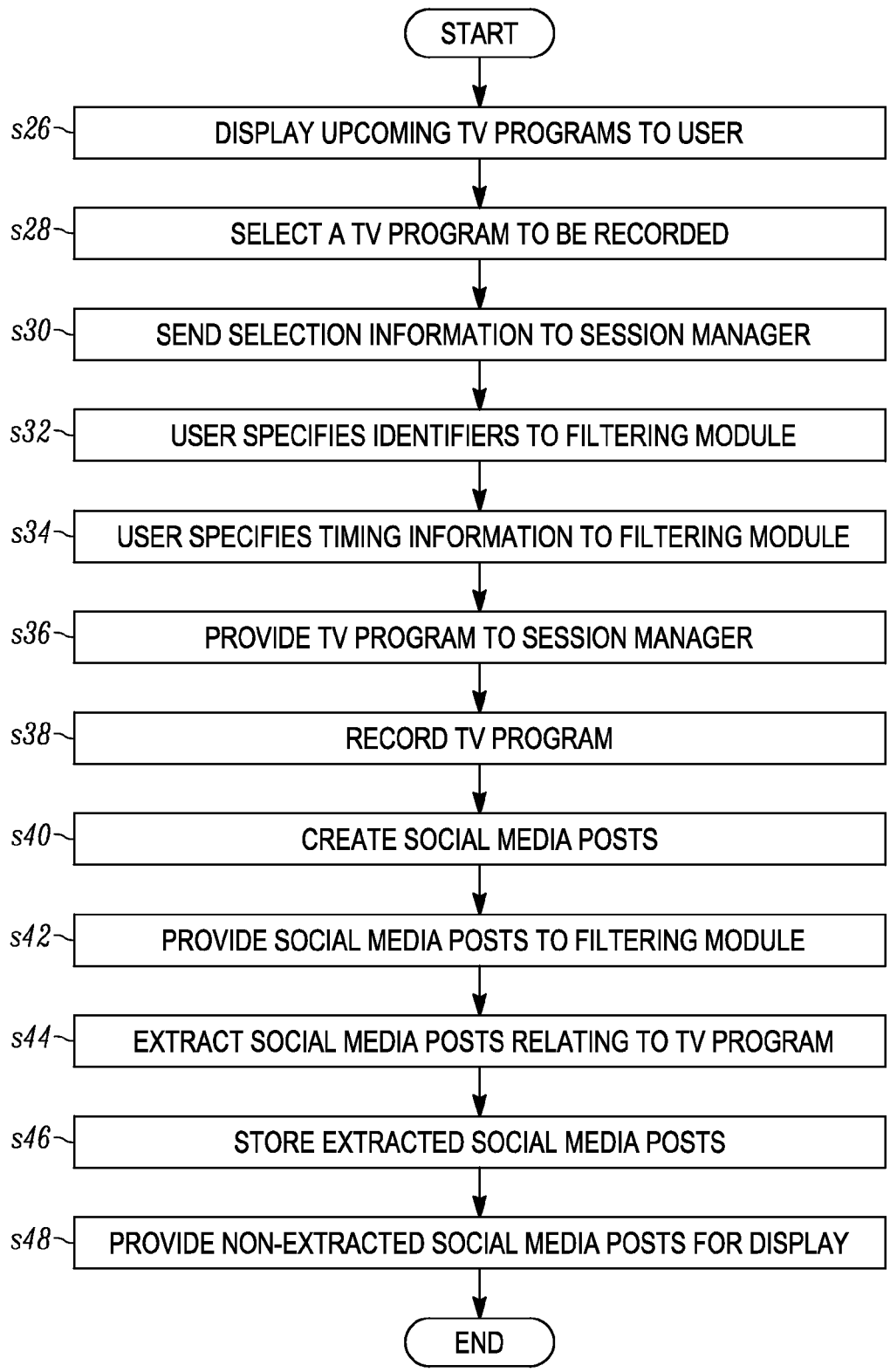
FIG. 5 is a process flow chart showing an example of a further process of storing social media posts in accordance with an embodiment.

FIG. 5 is a process flow chart showing a further embodiment of a method of processing social media posts 10, as may be performed by the entities of the network 20. The process of FIG. 5 includes the extraction of social media posts 10 from a stream of social media posts 10.

At s26, broadcast programming or scheduling information for current and upcoming TV programs is displayed to the user 44. This may, for example, be performed in the same way as at s2 of the process of FIG. 4.

At s28, the user 44 selects the TV program 2 to be recorded so that the user 44 may watch the TV program 2 at some later time. This may, for example, be performed in the same way as at s4 of the process of FIG. 4.

At s30, an indication that the user 44 has selected the TV program 2 to be recorded is sent to the session manager 28. This may, for example, be performed in the same way as at s6 of the process of FIG. 4.

At s32, the user 44 (or another party) provides the filtering module 38 with one or more identifiers 12 that may identify, and/or be used to identify, a social media post 10 as relating to the TV program 2. For example, the user 44 may specify one or more tags, keywords, key-terms, or hashtags that relate to the TV program 2, which may then be used by the filtering module 38. For example, if filtering module 38 and social networking client 42 are located in the same playback device (e.g., a computer of the user 44), the user may input one or more identifiers 12 into that playback device. The identifiers 12 supplied by the user 44 may include any kind of metadata that can be used, e.g., by browsing or searching a stream of social media posts 10, to find or detect (within that stream of social media posts) those social media posts 10 that relate to the TV program 2 or events occurring therein. The identifiers 12 supplied by the user 44 may include any kind of metadata that is usable to extract, from a stream of social media posts 10, those social media posts 10 that relate to the TV program 2 or events occurring therein.

Any appropriate process may be used by the user 44 at s32 to provide the one or more identifiers 12. For example, the user 44 may retrieve the identifiers 12 from a database of such identifiers. Also for example, the user 44 may acquire identifiers 12 from the maker of the TV program 2, or the provider of the TV program 2 (i.e., the content provider 22), after identifiers have been specified by the maker, or provider, of the TV program 2. Also for example, the user 44 may acquire identifiers 12 from the social networking service provider 34. Also for example, the user may "make up", or guess, appropriate identifiers 12.

Thus, at step s32 the filtering module 38 acquires one or more filtering criteria which specify media content (i.e., content-specific filtering criteria). In some embodiments, the filtering module 38 acquires a different type of content-specific filtering criteria instead of or in addition to identifiers 12 that may be used by the filtering module 38 to extract social media posts from the input stream.

At s34, the user 44 (or another party) provides the filtering module 38 with scheduling, or timing, information relating to the TV program 2. This timing information includes the start time 4 and the end time 6 of the TV program 2. The user may, for example, manually input the timing information into the filtering module 38. For example, if filtering module 38 and social networking client 42 are located in the same client device (e.g., a computer of the user 44), the user may input the timing information for the TV program 2 into that client device. Scheduling, or timing, information for the TV program 2 may be acquired by the user 44, e.g., by the user 44 viewing scheduling information (provided by the EPG 26) on the TV 32.

At s36, the content provider 22 provides the TV program 2, to the session manager 28, for presentation. This may, for example, be performed in the same way as at s14 of the process of FIG. 4.

At s38, the session manager 28 records the received TV program 2. This may, for example, be performed in the same way as at s16 of the process of FIG. 4. Similarly to s16, concurrently with the session manager 28 recording the TV program 2, the TV program 2 may be displayed (e.g., using further TVs) to consumers who are different to the user 44.

At s40, concurrently with the presentation of the TV program 2, users of the social networking service provided by the social networking service provider 34 that are consuming the TV program 2 as it is presented create or publish social media posts 10 that relate to the TV program 2. This may, for example, be performed in the same way as at s17 of the process of FIG. 4.

At s42, the social networking service provider 34 provides social media posts 10, as a stream of social media posts 10, to the filtering module 38. This may, for example, be performed in the same way as at s18 of the process of FIG. 4.

At s44, the filtering module 38 filters the received stream of social media posts so as to extract, from the input stream, those social media posts 10 that relate to the TV program 2. This may, for example, be performed in the same way as at s20 of the process of FIG. 4. Thus, at s44, social media posts that relate to the TV program 2, and have been created or published during the broadcast of the TV program 2, are extracted from the stream of social media posts 10.

At s46, the social media posts 10 that have been extracted from the stream of social media posts 10, by the filtering module 38, are stored or indexed in the database 40. This may, for example, be performed in the same way as at s22 of the process of FIG. 4.

The data stored in the database 40 for an extracted social media post is usable to ascertain a time reference (e.g., a time indicator 14) for that social media post, such that that social media posts can be provided for playback, by a playback device, synchronously with a playback by the user 44 of the TV program 2. For example, the data stored in the database 40 for an extracted social media post comprises a time reference for that social media post.

The data stored in the database 40 for an extracted social media post may be indicative of an opinion expressed in that social media post 10 (e.g., by the creator or publisher of the social media post 10). The opinion expressed in the social media post may relate to any subject, such as the TV program 2 or events occurring within the TV program 2. This "opinion information" may, for example, be based upon social voting tools (such as star ratings, or flags, or like buttons) that allow viewers to tag social media posts. Alternatively, this opinion information may be manually specified or specified by using AI-based natural language processing, or otherwise. As described in more detail later below with reference to FIG. 7, during playback of social media posts 10, the filtering module 38 may filter social media posts 10 depending on the opinion information such that only those social media posts whose opinion information satisfies certain criteria are presented to a user.

At s48, the social media posts 10 that have not been extracted from the stream of social media posts 10, by the filtering module 38, are sent to the social networking client 42. The social networking client 42 provides the received social media posts 10 for consumption by the user 44. This may, for example, be performed in the same way as at s24 of the process of FIG. 4.

Thus, at s48, social media posts 10 that do not relate to the TV program 2 are sent to the social networking client 42 so that they may be provided for consumption by the user 44. However, social media posts 10 that relate to the TV program 2 (and have been extracted from the stream of social media posts 10) are not sent to the social networking client 42 at the current time.

Thus, a further method of processing social media posts 10 (which includes the extraction of social media posts 10 from a stream of social media posts 10) is provided.

An advantage provided by the above described processes is that social media posts 10 that relate to the TV program 2 are not presented to the user 44 during the presentation (e.g., the broadcast) of the TV program 2. The social media posts relating to the TV program 2 are advantageously filtered-out, or removed, from a stream of social media posts 10 that is presented to the user 44. Thus, the user 44 tends not to be presented with social media posts 10 that contain "spoilers" or other pertinent information relating to the TV program 2.

A further advantage is that social media posts 10 that do not relate to the TV program 2 may still be presented to the user 44. Thus, the user 44 may still use social networking services even though they wish to avoid "spoiler" information.

The social media posts 10 that relate to the TV program 2 are advantageously stored for future playback, or information that may be used to retrieve the social media posts 10 that relate to the TV program 2 for future provision to a playback device is stored. Thus, the extracted social media posts may be presented to the user 44 at some future time e.g., when the user 44 watches the TV program 2 (on a time-shifted basis relative to the initial presentation of the TV program 2). An example method by which stored social media posts may be provided to the user 44 is described in more detail later below with reference to FIG. 7. Thus, when (at some future time) the user 44 watches the TV program 2, the social media associated with the TV program 2 may be displayed to the user 44. Thus, the relevant social media posts may advantageously be time-shifted to coincide with the later consumption of the TV program 2.

Figure 6:
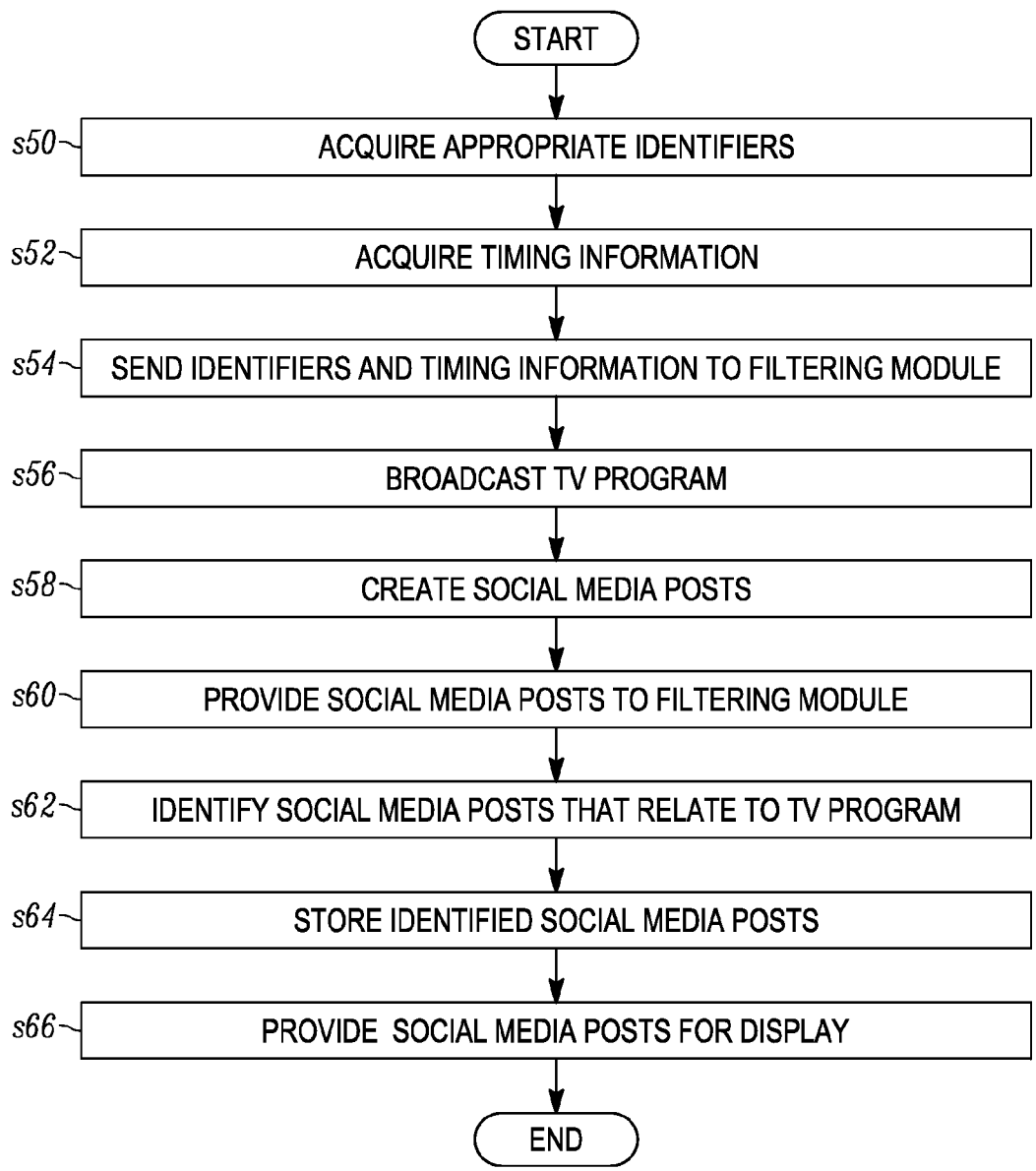
FIG. 6 is a process flow chart showing an example of a further process of storing social media posts in accordance with an embodiment.

FIG. 6 is a process flow chart showing a further embodiment of a method of processing social media posts 10 performed by the entities of the network 20. The process of FIG. 6 includes the extraction of social media posts 10 from a stream of social media posts 10.

At s50, one or more identifiers 12 that identify, and/or can be used to identify, a social media post 10 as relating to the TV program 2 are specified. Identifiers 12 may, for example, be specified by the maker of the TV program 2, or the provider of the TV program 2 (i.e., the content provider 22). Identifiers 12 may, for example, be specified by an operator or user of the filtering module 38, or by the filtering module 38 itself. Identifiers 12 may, for example, be specified by a different party i.e., other than the maker or provider of the TV program 2 and the operator or user of the filtering module 38. The specified identifiers 12 may include one or more tags, keywords, key-terms, or hashtags that relate to the TV program 2. The specified identifiers 12 are any kind of metadata that is usable to, e.g., by browsing or searching a stream of social media posts 10, find or detect within that stream of social media posts those social media posts 10 that relate to the TV program 2 or events occurring therein. Also, the specified identifiers 12 are any kind of metadata that is usable to extract, from within a stream of social media posts 10, those social media posts 10 that relate to the TV program 2 or events occurring therein. Any appropriate process may be used at s50 to specify the one or more identifiers 12. In some embodiments, identifiers 12 may be specified before broadcast of the TV program 2, e.g., by in effect guessing or estimating identifiers 12 that may be used. However, in other embodiments, identifiers 12 may be specified after or during broadcast of the TV program 2, e.g., by selecting top-trending identifiers during broadcast, or discovering the most popular identifiers 12 used after the broadcast of the TV program 2.

Thus, at step s32 the filtering module 38 acquires one or more filtering criteria which specify media content (i.e., content-specific filtering criteria). In some embodiments, the filtering module 38 acquires a different type of content-specific filtering criteria instead of or in addition to identifiers 12 that may be used by the filtering module 38 to extract social media posts from the input stream.

At s52, scheduling (or timing) information for the TV program 2 is acquired from the EPG 26. This scheduling information includes the start time 4 and the end time 6 for the upcoming presentation of the TV program 2. This timing information may be acquired, for example, by the maker of the TV program 2, the provider of the TV program 2 (i.e., the content provider 22), an operator or user of the filtering module 38, the filtering module 38 itself, or a different party.

At s54, the specified identifiers 12 relating to the TV program 2, and the acquired scheduling information (or timing information), is sent from the respective parties that specified or acquired that information to the filtering module 38. The filtering module 38 receives the timing information and identifiers 12 relating to the TV program 2.

At s56, the content provider 22 provides the TV program 2 for presentation (e.g., for broadcast, unicast, multicast, etc.). The TV program 2 may be displayed on the TV 32 to the user 44. Also, instead of or in addition to being displayed on the TV 32, the TV program 2 may be recorded, e.g., by the session manager 28, e.g., for playback at a later time.

At s58, concurrently with the presentation of the TV program 2, users of the social networking service provided by the social networking service provider 34 (which may include the user 44), that are consuming the TV program 2, create or publish social media posts 10 that relate to the TV program 2. An identifier 12 of such a social media post 10 indicates that that social media post 10 relates to the TV program 2. A time indicator 14 of such a social media post 10 may indicate that that social media post 10 was published or created between the start time 4 and end time 6 of the TV program 2.

At s60, the social networking service provider 34 provides social media posts 10, as a stream of social media posts 10, to the filtering module 38. This may, for example, be performed in the same way as at s18 of the process of FIG. 4.

At s62, the filtering module 38 filters the received stream of social media posts so as to extract, from the received stream, those social media posts 10 that relate to the TV program 2. This may, for example, be performed in the same way as at s20 of the process of FIG. 4. Alternatively, in some embodiments, the social media posts 10 that relate to the TV program 2 are not extracted from the stream, and instead may be identified as relating to the TV program 2.

At s64, the social media posts 10 that have been extracted from the stream of social media posts 10, or identified as relating to the TV program 2 without being extracted, are stored or indexed in the database 40. In other words, in an embodiment, the filtering module 38 sends the social media posts 10 that relate to the TV program 2 (or sends data related to those social media posts 10) to the database 40 for storage or indexing.

The data stored in the database 40 for an extracted social media post is usable to ascertain a time reference (e.g., a time indicator 14) for that social media post, such that that social media posts can be provided for playback, by a playback device, synchronously with a playback by the user 44 of the TV program 2. For example, the data stored in the database 40 for an extracted social media post comprises a time reference for that social media post.

The data stored in the database 40 for an extracted social media post may be indicative of an opinion expressed in that social media post 10 (e.g., by the creator or publisher of the social media post 10). The opinion expressed in the social media post may relate to any subject, such as the TV program 2 or events occurring within the TV program 2. This "opinion information" may, for example, be based upon social voting tools (such as star ratings, or flags, or like buttons) that allow viewers to tag social media posts. Alternatively, this opinion information may be manually specified or specified by using AI-based natural language processing, or otherwise. As described in more detail later below with reference to FIG. 7, during playback of social media posts 10, the filtering module 38 may filter social media posts 10 depending on the opinion information such that only those social media posts whose opinion information satisfies certain criteria are presented to a user.

In some embodiments, social media posts 10 (and/or other information related thereto) received from the social networking service provider 34 are stored (in the database 40), e.g., by the filtering module, before any extraction of social media posts, or filtering of social media posts 10, is performed. For example, in some embodiments, all social media posts 10 (or information related thereto) received from the social media networking service provider 34 is stored and then, e.g., at some later time, filtered so that only those social media posts 10 that relate to the TV program 2, or only information related to those social media posts 10 that relate to the TV program 2, remain in the database 40. Also for example, in some embodiments, all social media posts 10 received from the social media networking service provider 34 may be stored and then, e.g., when (at some later time) it is indicated to the filtering module 34 that the TV program 2 is to be played back, the filtering module 34 may extract from the database 40 those social media posts 10 that relate to the TV program 2.

At s66, the social media posts 10 that have not been extracted from the stream of social media posts 10 (which may include only those social media posts that do not relate to the TV program 2, but may, in some embodiments, also include the social media posts that do relate to the TV program 2) are sent to the social networking client 42. The social networking client 42 may provide the received social media posts 10 for consumption by the user 44.

Thus, a further method of processing social media posts 10 (which includes the extraction of social media posts 10 from a stream of social media posts 10) is provided.

In some embodiments, the method of FIG. 6 further comprises the following method steps.

At some time after the start of the presentation of the TV program 2, the user 44 consumes the TV program 2 (e.g., a recorded version of the TV program 2). In other words, the user 44 begins to watch the TV program 2 on a time-shifted basis. The user 44 is identified as consuming the time-shifted TV program 2 in any suitable way, e.g., by the session manager 28 that has recorded the TV program 2 and that is replaying the recorded TV program 2 for consumption by the user 44.

While consuming the TV program 2, the user 44 creates or publishes one or more social media posts 10 related to the TV program 2. Because the user 44 is consuming the TV program 2 on a time-shifted basis, the user 44 may be privy to information relating to events that occur in the TV program 2 at some time after the current point in the playback of the TV program 2. Thus, one or more of the user's social media posts 10 may contain "spoilers" about future events within the TV program 2.

The filtering module 38 receives social media posts created or published by the user 44, concurrently with the user 44 consuming the time-shifted TV program 2. These social media posts may, for example, be received by the filtering module 38 in response to an initial set of filtering criteria that specify that the filtering module 38 is to receive (e.g., only) social media posts created or published by the user 44 (e.g., concurrently with the user's consumption of the TV program 2).

The filtering module 38 filters the social media posts created or published by the user 44 to extract, from the received stream, those social media posts 10 that relate to the TV program 2. This may, for example, be performed in the same way as at s20 of the process of FIG. 4. Alternatively, in some embodiments, the social media posts 10 that relate to the TV program 2 are not extracted from the stream, and instead may be identified as relating to the TV program 2.

The social media posts 10 that have been extracted from the stream of social media posts 10, or identified as relating to the TV program 2 without being extracted, are stored in the database 40 (e.g., as a separate data set to the social media posts 10 created or published during the initial presentation of the TV program 2). In other words, the filtering module 38 sends the social media posts 10 that relate to the TV program 2 to the database 40.

In other embodiments, instead of or in addition to storing the extracted or identified social media posts, the filtering module 38 stores indicia (such as URLs, pointers, or other identifiers) corresponding to the extracted or identified social media posts, for enabling future retrieval and presentation of the extracted social media posts, e.g., from a network-accessible storage device, database, server, or archive.

Also in other embodiments, instead of or in addition to storing the extracted or identified social media posts or indicia related thereto, the filtering module stores some function (e.g., a hash) of the extracted or identified social media posts (or information that may be used to identify the extracted social media posts, such as a time reference and creator or publisher information) for enabling the distinguishing of the extracted social media posts from other social media posts (e.g., in a replayed or played back stream of social media posts received from a social networking service).

The data stored in the database 40 for an extracted social media post is usable to ascertain a time reference (e.g., a time indicator 14) for that social media post, such that that social media posts can be provided for playback, by a playback device, synchronously with a playback by the user 44 of the TV program 2. For example, the data stored in the database 40 for an extracted social media post comprises a time reference for that social media post In some embodiments, the social media posts created or published by the user 44, concurrently with the user 44 consuming the time-shifted TV program 2 are analysed (e.g., manually or by one or more processors) to determine whether or not each of those social media posts 10 contain information relating to an event that occurs within the TV program 2 at some time after the time in the TV program 2 to which that social media post 10 relates. In other words, the social media posts 10 created or published by the user 44, concurrently with the user 44 consuming the time-shifted TV program 2 are analysed to determine whether those posts contain "spoilers". Social media posts that contain spoilers may be assigned a "spoiler tag" (e.g., metadata that identifies that social media post as containing a spoiler).

In some embodiments, all of the social media posts created or published by the user 44, concurrently with the user 44 consuming the time-shifted TV program 2 are assigned a spoiler tag irrespective of whether or not they contain spoilers. This advantageously avoids the performance of an analysis process for determining whether or not a social media post 10 contains a spoiler.

A further advantage provided by the process of FIG. 6 is that social media posts 10 relating to certain broadcasts may be stored. These social media posts 10 may be stored in such a way that a social media feed to a user 44 of the social networking service is not interrupted (i.e., the user 44 may be presented with all social media posts 10). Thus, for example, social media posts 10 that relate to an important broadcast (such as an important or iconic sporting event, or an event of national or international importance) may be stored. The stored social media posts may provide a rich resource for research (e.g., future sociological research). The social media posts may be stored for posterity.

Also, the social media posts 10 may be stored for provision to viewers of the TV program 2, when that TV program 2 is re-broadcast. An example method by which stored social media posts may be provided to viewers is described in more detail later below with reference to FIG. 7. The provision of the stored social media posts 10 when the TV program 2 is re-broadcast advantageously tends to enhance the viewing experience of the viewers of the re-broadcast TV program 2.

An advantage provided by the assignment of such spoiler tags is that, during playback of the social media posts by a playback device (e.g., as described in more detail later below), a user to whom the social media posts are being played back may select whether or not to play back the "spoiler" social media posts. In other words, a user to whom the social media posts are being played back may either specify that, during playback of the social media stream, the social media posts 10 that have been assigned a spoiler tag are not displayed to that user, or specify that, during playback of the social media stream, the social media posts 10 that have been assigned a spoiler tag are displayed to that user. Thus, if a user so wishes, the user may advantageously avoid being exposed to spoiler information contained within the social media posts relating to the TV program 2.

In some embodiments, social media posts associated with an important sporting event (or other important broadcast) may be stored in a long term database. When that event is re-broadcast, the social media associated with that event may be displayed to viewers. Thus, in addition to or instead of viewing contemporaneous social media posts, a viewer of the re-broadcast may advantageously view comments etc. from time-shifted viewers (i.e., viewers of an earlier broadcast of the TV program 2). In other words, some embodiments provide one or more enhanced or alternate stream of social media comments from time-shifted viewers (from one or more earlier time periods), synchronized with the portion of the video that the commenter was watching when the comment was entered.

In an illustrative example, viewers in the year 2033 who watch a sporting event played in the year 2013 (e.g., a "classic" sporting event) might see a first "live" stream of contemporaneous social media posts (synchronized appropriately with the game) from people who were commenting while viewing the game live during a first broadcast in 2013. They would also be able to access a second stream of social media posts (also synchronized appropriately with the game) from people who viewed a recording or rebroadcast of the game subsequent to the first broadcast. Thus, the second stream of social media posts does not include "live" commentary, but can include social media posts from the entire time period thereafter (e.g., from later in 2013 through 2033), or any selected portions or subsets of that time period. In a further illustrative example, viewers in 2015 who watch a recording or rebroadcast of a "classic" game played in 1970 could see a stream of social media posts that have accrued over some number of years, but which would only begin at or after a time when social media networking became available, and thus would not include a stream from original live viewers of the game in 1970. Social media posts 10 relating to a plurality of re-broadcasts of a TV program 2 may thus be compiled over a time period (e.g., over several years or decades). Such a compilation can accrue considerable historical value. It is also noteworthy that in the foregoing illustrative example, the first "live" stream can be reliably considered free of spoiler information, because all of the social media posts in the first stream were published contemporaneously with the occurrence of the event.

Any of the features of the processes of FIG. 4, FIG. 5, and FIG. 6 may be combined. A resulting process may provide any or all of the advantages provided by the processes of FIG. 4, FIG. 5, or FIG. 6

What will now be described is a process of playing back stored social media posts 10 (i.e., social media posts 10 that may have been stored using a method described above with reference to FIGS. 4 to 6)

Figure 7:
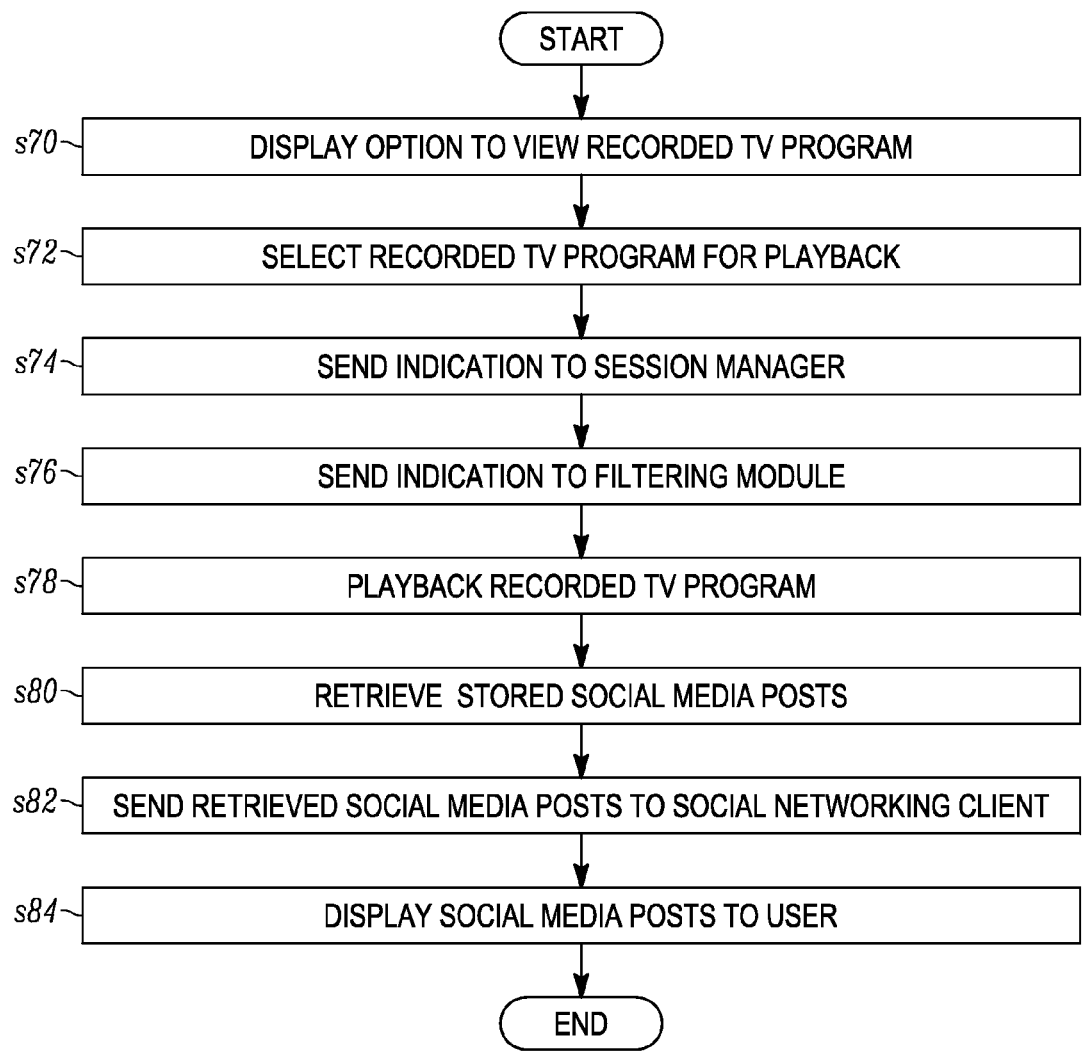
FIG. 7 is a process flow chart showing an example of a process of providing stored social media posts for consumption in accordance with an embodiment.

FIG. 7 is a process flow chart showing a further embodiment of a method of processing social media posts 10 performed by the entities of the network 20. The process of FIG. 7 includes the playing back of social media posts 10 that have been stored in the database 40 (e.g., using one of the processes described above with reference to FIGS. 4 to 6). The process of FIG. 7 may, for example, be performed sometime after an original presentation (e.g., broadcast) of the TV program 2.

At s70, an option for the user 44 to view the TV program 2 on the TV 32 is presented to the user 44. For example, the option to view the TV program 2 may be displayed on the TV 32 to the user 44. For example, if the TV program 2 was recorded by the user 44 at some earlier time, an option for the user 44 to view the recording of the TV program 2 may be presented to the user 44.

At s72, the user 44 selects the option to view the TV program 2. In other words, the user 44 indicates that they wish to view the TV program 2. This indication that the user 44 wishes to view the TV program 2 is performed using any appropriate mechanism, for example, the user may select, using a controller of the TV 32, the TV program 2 from a list of recorded TV programs that is displayed on the TV 32.

At s74, an indication that the user 44 wishes to view the TV program 2 is sent to the session manager 28, e.g., from the TV 32 via the set-top box 30. This indication identifies the TV program 2.

The indication received by the session manager 28 includes an instruction to the session manager 28 to replay a recording of the TV program 2. In some embodiments, the indication received by the session manager 28 includes an instruction to the session manager 28 to retrieve the TV program 2 from a source or store of multimedia content.

At s76, an indication that the TV program 2 is to be played back to the user 44 is sent from the session manager 28 to the filtering module 38 (e.g., via the Internet 36). This indication includes a start time at which playback of the TV program 2 is to begin. In some embodiments, this indication may also include one or more identifiers 12 that were previously used, by the filtering module 38, to identify (and possibly extract) social media posts 10 that related to the TV program 2 (from a stream of social media posts 10).

In some embodiments, the filtering module 38 may acquire an indication that the TV program 2 is to be viewed by a user 44 in a different way from that described above. For example, in some embodiments, a broadcaster (e.g., a provider of the TV program 2) may indicate to the filtering module 38 that the TV program 2 is to be re-broadcast. Also for example, the user 44 may input into the filtering module 38 an indication that they are about to view the TV program 2. Such an indication may include a start time for the re-broadcasting or playback of the TV program 2. Also, such an indication may include an instruction that the filtering module 38 is to acquire and provide the social media posts 10 that relate to the TV program 2 (e.g., beginning at the indicated start time).

At s78, the session manager 28 provides the TV program 2 (e.g., the recording of the TV program 2) for display to the user 44. The TV 32 presents the TV program 2 to the user 44.

At s80, the filtering module 38 acquires those social media posts 10 that relate to the TV program 2.

In some embodiments (for example, in embodiments in which social media posts 10 that relate to the TV program 2 have been stored in the database 40), the filtering module 38 retrieves, from the database 40, those social media posts 10 that relate to the TV program 2. This retrieval process may be performed using the identifiers 12 relating to the TV program 2 that may have been previously used by the filtering module 38 to identify the social media posts 10 that relate to the TV program 2. For example, the filtering module 38 retrieve, from the database 40, those social media posts 10 whose identifier(s) 12 match one or more of the previously used identifiers 12. In other words, the filtering module may filter the database 40 using the identifiers 12 relating to the TV program 2. In some embodiments, only social media posts 10 relating to the TV program 2 have been stored in the database 40. In such embodiments, all social media posts 10 within the database 40 may be acquired from the database 40.

In other embodiments (for example, in embodiments in which indicia or other information for identifying those social media posts 10 that relate to the TV program 2 were stored), the filtering module 38 uses those stored indicia or other information to acquire the social media posts 10 that relate to the TV program 2.

For example, in some embodiments, the filtering module 38 receives a further stream or set of social media posts 10. This further stream of social media posts 10 may include all of those social media posts 10 that were provided by the social networking service provider 34 during the earlier broadcast of the TV program 2. The further stream of social media posts 10 may be provided by the social networking service provider 34. For example, the further stream may be a re-transmission of those social media posts 10 provided at s18 and s42. Alternatively, the further stream may be provided to the filtering module 38 by a different entity. The further stream may be received by the filtering module 38 in response to a request (i.e. a request that the further stream is sent to the filtering module 38) being sent to the entity that provides the further stream, for example, by the filtering module 38 or the session manager 28. The filtering module 38 may then use the indicia or other information stored within the database 40 to identify those social media posts 10 within the further stream that relate to the TV program 2.

For example, in some embodiments, a hash (or some other function) of each social media post 10 that relates to the TV program 2 is stored in the database 40. Upon receiving the further stream, the filtering module 38 determines a hash of each of the social media posts 10 within the further stream. The filtering module 38 then compares the hashes of the social media posts of the further stream with the stored hashes. The filtering module 38 identifies as relating to the TV program 2 each social media post within the further stream whose hash matches a hash stored in the database 40, and thereby acquires the social media posts 10 relating to the TV program 2.

In another embodiment, for each social media post 10 that relates to the TV program 2, an "information set" is stored in the database 40. Preferably, an information set for a social media post 10 includes at least a unique identifier of the publisher and a time indicator 14 of that social media post. Upon receiving the further stream, the filtering module 38 determines the "information set" of each of the social media posts 10 within the further stream. The filtering module 38 then compares the information sets of the social media posts of the further stream with the stored information sets. The filtering module 38 identifies as relating to the TV program 2 each social media post within the further stream whose information set matches an information set stored in the database 40, and thereby acquires the social media posts 10 relating to the TV program 2.

In embodiments in which a spoiler tag has been assigned to some or all of the extracted social media posts, the user 44 to whom the social media posts are to be played back may select whether or not to play back the "spoiler" social media posts. In embodiments in which the user 44 selects not to have spoiler information (e.g., the social media posts 10 that have been assigned a spoiler tag) displayed to them, the social media posts that have been assigned a spoiler tag are not acquired by the filtering module 38 (e.g., the filtering module 38 may filter out these posts using the spoiler tag as a filtering criteria). In embodiments in which the user 44 selects to have spoiler information (e.g., the social media posts 10 that have been assigned a spoiler tag) displayed to them, the social media posts that have been assigned a spoiler tag are acquired by the filtering module 38 (e.g., the filtering module 38 performs no filtering of the social media posts using the spoiler tag as a filtering criteria).

In embodiments in which the data stored for a social media post 10 specifies an opinion (with respect to a certain subject) expressed within that social media post 10, the user 44 to whom the social media posts 10 are to be played back may select only to have displayed to them the social media posts 10 whose corresponding opinion information fulfils certain criteria (e.g., user specified criteria). For example, the user may specify criteria (or a user preferences) that the filtering module 38 can implement so as to screen from the user (e.g., filter out and not display to the user 44) those social media posts that express opinions that oppose the user's opinions.

In a further embodiment, affinity information can be used in addition to opinion information, or as a proxy for opinion information. In an illustrative example, a football rivalry may exist between a Philadelphia team and a Dallas team, and users are able to indicate their affinity for a team (e.g., by creating a corresponding affinity indication in a user profile, by "liking" the team, and so forth). Using such affinity information, a fan of the Philadelphia team viewing a game between Philadelphia and Dallas could choose to filter the social media posts, so as to view only social media posts that are highly rated by fellow fans of the Philadelphia team. Another fan of the Philadelphia team, desiring to be more inclusive, might still desire to exclude social media posts that are determined to be biased against the Philadelphia team. An indication of bias can be automatically determined, for example, if a particular social media post is rated positive by fans of the Dallas team and is also rated negative by fans of the Philadelphia team.

In a still further embodiment, a degree of protection is provided against false or misleading affinity information. For example, malicious or spiteful individuals, sometimes known as "trolls") might deliberately misidentify themselves or misrepresent their affinities in order to post social media posts that will be viewed by other users who have a corresponding truthful affinity, and that would tend to provoke, annoy, or harass such users. In an illustrative example, a fan of the Dallas team might misrepresent his affinity information, falsely stating himself to be a fan of the Philadelphia team, for the purpose of causing his deliberately provocative social media posts to be viewed by Philadelphia fans. Thus, in a further embodiment, an AI system, or social voting/reporting, or a combination of both, can be used by the filtering module 38 for detecting such misrepresentations, so as to provide greater accuracy in filtering social media posts published by individuals associated with false or misleading affinity information.

At s82, the social media posts 10 that are acquired by the filtering module 38 are sent to the social networking client 42. The provision, to the social networking client 42, of the social media posts 10 that relate to the TV program 2 is such that a social media post 10 is provided at the time (within the TV program 2) indicated by the time indicator 14 of that social media post 10. Thus, a social media post 10 is provided to the user 44 so that it coincides with the portion of the TV program 2 to which that social media post 10 relates. In other words, the social media posts 10 relating to the TV program 2 are presented to the user synchronously with the playback of the TV program 2. For example, if a social media post 10 was created or published in relation to the point 8 within the TV program 2 and the time indicator 14 of that social media post 10 indicated a time $t=t_1$, then that social media post 10 is provided to the social networking client 42, when the point 8 of the TV program 2 is displayed (on the TV 32) to the user 44 (i.e., at $t=t_1$ within the TV program 2). The filtering module 38 may use an indication of the start time of the TV program 2 (that may have been sent to the filtering module 38 at s76) to determine when a social media post 10 should be sent to the social networking client 42.

At s84, the social networking client 42 presents the received social media posts 10 for consumption by the user 44, e.g., as those posts are received by the social networking client 42.

Thus, a method of processing social media posts 10 (which includes the playing back social media posts 10 that have been stored in the database 40) is provided.

An advantage provided by the process of playing back social media posts 10 that have been stored in the database 40 is that social media posts 10 that relate to the TV program 2 are "time-shifted" and are displayed to the user 44 when the user 44 watches the TV program 2. Thus, the user's viewing experience tends to be enhanced by his consumption of social media that was produced during an earlier broadcast of the TV program 2. Also, a social media post 10 is provided to the user 44 so that its display coincides with the display of the portion of the TV program 2 to which that social media post 10 relates.

Playback of the TV program 2 by the user 44 may be paused, fast-forwarded, rewound etc. Playback of the stream of social media posts 10 that relate to the TV program 2 may be automatically paused, fast-forwarded, rewound etc. in a corresponding fashion.

The above described methods and apparatus may apply to TV programs that are replayed a relatively long time after an original broadcast (e.g., days, months, or years). Also, the above described methods and apparatus can be applied to TV programs that are replayed a relatively short time (e.g., seconds, minutes, or hours) after an original broadcast; for example, a TV program that is watched "nearly live," but with a relatively brief delay, such as by using a DVR feature for pausing a program as it is received (e.g., live, linear, or streamed program content).

Thus, for example, the user 44 may pause a live broadcast for a few minutes or seconds, and later resume viewing the broadcast in a time-shifted manner with the few minutes or seconds of delay. The social media stream being consumed by the user is automatically delayed by the same length of time as the broadcast, such that the broadcast and the social media stream remain synchronized. In an illustrative example, a user 44 decides to pause a live broadcast program for five minutes to take a brief break, and then resumes viewing with a five-minute delay. If the user 44 is viewing social media posts while watching the program, embodiments are able to prevent the social media posts from being viewed out of synchronization with the viewing experience, thus reducing the potential for unwanted spoiler information to be viewed by the user 44. For example, embodiments are able to prevent the undesirable situation in which the user 44 (who paused for five minutes while viewing a sporting event) then receives social media posts from other viewers who are discussing live events that will not be seen by the user 44 until five minutes into the future, i.e., spoiler information for events that the user 44 has not yet seen. Embodiments are able to prevent such occurrences, assuring the user 44 that social media posts being viewed will remain synchronized with the event and free of spoilers.

In some embodiments, the filtering module 38 includes a feature that is configured to automatically screen social media posts 10 for spoilers (e.g., information relating to events that occur in the TV program 2 sometime after the time indicated by the time indicator 14 of that social media post 10). This screening can be accomplished manually, or by using AI-based natural language processing, or by social voting, or any conventional technique or combination of these. Social media posts 10 that are determined to contain spoilers may be removed from the feed provided for consumption by the user 44.

Thus, in some embodiments, one or more of the following streams of social media posts 10 are provided to the user 44: (i) a stream of original comments corresponding to a current broadcast of the TV program 2; (ii) a stream of comments from time-shifted viewers, synchronized with the portion of the TV program 2 that they were watching when the comment was published; (iii) a stream of comments (from (i) and/or (ii)) that are filtered (e.g., automatically screened for spoilers) for the benefit of first time viewers who may be time shifted.

It will be understood that although a number of the examples set forth above have concerned sporting events, the TV program 2 may be of any genre, for example, a history documentary, a news broadcast, an entertainment program, a sports program, etc. Embodiments relating, for example, to spoiler tags or spoiler information are applicable to any of the above types of content, e.g., any content in which it is undesirable to reveal information on an untimely basis, such as sports, reality television, talent contests, cooking competitions, comedy, dramatic presentations, and the like.

One or more general-purpose computing device having one or more processors, can be configured (e.g., by one or more software applications) to provide embodiments. The above referenced computing devices can physically be provided on a circuit board or within another electronic device and can include various processors, microprocessors, controllers, chips, disk drives, and the like. Particular embodiments may be implemented in a non-transitory computer-readable storage medium for use by or in connection with a computing device, system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments. It will be apparent to one of ordinary skill in the art the modules, processors, controllers, units, and the like may be implemented as electronic components, software, hardware or a combination of hardware and software.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

We claim:

1. A method of processing social media posts, the method including:
   receiving, by a filtering module, a first input stream comprising a first plurality of social media posts from a social networking service, the social media posts of the first input stream having been published concurrently with a first presentation of a certain multimedia content;
   acquiring, by the filtering module, one or more content-specific filtering criteria that relate to the certain multimedia content;
   filtering, by the filtering module, in accordance with the content-specific filtering criteria, the first input stream to extract, from the first input stream, a second plurality of social media posts, each of the second plurality of social media posts relating to the certain multimedia content;
   for each of the second plurality of social media posts, storing, in a storage module operatively coupled to the filtering module, data corresponding to that social media post, thereby storing a first data set;
   receiving, from the social networking service, by the filtering module, a second input stream comprising a third plurality of social media posts, the social media posts of the second input stream having been published concurrently with a second presentation of the certain multimedia content, the second presentation of the certain multimedia content being time-shifted relative to the first presentation of the certain multimedia content;

filtering, by the filtering module, in accordance with the content-specific filtering criteria, the second input stream to extract, from the second input stream, a fourth plurality of social media posts, each of the fourth plurality of social media posts relating to the certain multimedia content; and for each of the fourth plurality of social media posts, storing, in the storage module, data corresponding to that social media post, thereby storing a second data set; wherein the first data set is for ascertaining a time reference for each of the second plurality of social media posts, such that the second plurality of social media posts is accessible for future provision to a playback device associated with a user, and for playback, in the playback device, synchronously with a playback by the user of the certain multimedia content;

the second data set is for ascertaining a time reference for each of the fourth plurality of social media posts, such that the fourth plurality of social media posts is accessible for future provision to the playback device, and for playback, in the playback device, synchronously with a playback by the user of the certain multimedia content; and the second data set comprises, for each social media post of the fourth plurality that includes information relating to an event that occurs within the certain multimedia content after the time corresponding to the time reference of that social media post, a spoiler indicator.

2. The method of claim 1, the method further including:
in the playback device, displaying the second and fourth pluralities of social media posts to the user, and synchronously rendering the certain multimedia content for display to the user.

3. The method of claim 2, wherein the social media posts of the fourth plurality that correspond to a spoiler indicator are only displayed to the user with the permission of the user.

4. The method of claim 1, the method further including:
in the playback device, displaying the second and fourth pluralities of social media posts to the user, and synchronously rendering, with a second playback device, the certain multimedia content for display to the user.

5. The method of claim 4, wherein the social media posts of the fourth plurality that correspond to a spoiler indicator are only displayed to the user with the permission of the user.

6. The method of claim 1, the method further including:
receiving, by the filtering module, a third input stream comprising a fifth plurality of social media posts;
using the stored first and second data sets, identifying, by the filtering module, each social media post in the fifth plurality that is the same as a social media post in the second plurality or the fourth plurality; and
displaying, to the user, those social media posts in the fifth plurality that have been identified as being the same as a social media post in the second plurality or the fourth plurality, and synchronously rendering the certain multimedia content for display to the user.

7. The method of claim 6, wherein each of the social media posts in the first plurality is the same as a social media post in the fifth plurality.

8. The method of claim 6, wherein each of the social media posts in the third plurality is the same as a social media post in the fifth plurality.

9. The method of claim 6, wherein the third input stream is received from the social networking service.

10. The method of claim 6, wherein the third input stream is received in response to a request being sent by the filtering module, the request being a request that the third input stream be returned to the filtering module.

11. The method of claim 6, wherein identifying each social media post in the fifth plurality that is the same as a social media post in the second plurality or the fourth plurality comprises:
determining data corresponding to each of the third plurality of social media posts;
for each social media post in the fifth plurality, comparing the data determined for that social media post to the stored data corresponding; and
for each social media posts in the fifth plurality, identifying that social media post as being the same as a social media post in the second plurality or fourth plurality if the data determined for that social media post is the same as the stored data corresponding a social media post in the second plurality or fourth plurality.

12. The method of claim 1, wherein:
the first data set comprises, for each social media post in the second plurality of social media posts, affinity information that indicates an affinity, in relation to a certain subject, of a publisher of the social media post; and
the second data set comprises, for each social media post in the fourth plurality of social media posts, affinity information that indicates an affinity, in relation to a certain subject, of a publisher of the social media post.

13. The method of claim 12, wherein the information that indicates an affinity in relation to a certain subject comprises one or more social voting scores, wherein a social voting score for a social media post is indicative of an opinion of that social media post of a group of users of the social networking service.

14. The method of claim 12, the method further comprising:
ascertaining a user affinity, the user affinity being indicative of an affinity, in relation to the certain subject, of the user;
in the playback device, displaying, to the user, social media posts in the second and fourth pluralities of social media posts; and
synchronously rendering, in the playback device, the certain multimedia content for display to the user; wherein
a social media post is only displayed if the affinity, in relation to the certain subject, of the publisher of the social media post is the same as the affinity, in relation to the certain subject, of the user.

15. The method of claim 12, the method further comprising:
ascertaining a user affinity, the user affinity being indicative of the affinity, in relation to the certain subject, of the user;
in the playback device, displaying, to the user, social media posts in the second and fourth pluralities of social media posts; and
synchronously rendering, in a second playback device, the certain multimedia content for display to the user; wherein
a social media post is only displayed if the affinity, in relation to the certain subject, of the publisher of that social media post is the same as the affinity, in relation to the certain subject, of the user.

16. The method of claim 1, wherein the method further comprises:

identifying each social media post within the fourth plurality that includes information relating to an event that occurs within the certain multimedia content after the time corresponding to time reference of that social media post; and assigning, to each identified social media post, a spoiler indicator.

17. The method of claim 1, wherein the one or more content-specific filtering criteria are specified by a provider of the certain multimedia content.

18. The method of claim 1, wherein:
the first data set comprises a time reference for each of the second plurality of social media posts; and
the second data set comprises a time reference for each of the fourth plurality of social media posts.

19. The method of claim 1, wherein:
the first data set comprises text content for each of the second plurality of social media posts; and
the second data set comprises text content for each of the fourth plurality of social media posts.

20. The method of claim 1, wherein:
the first data set comprises indicia for each of the second plurality of social media posts; and
the second data set comprises indicia for each of the fourth plurality of social media posts; wherein
indicia corresponding to a social media post is for future retrieval of that social media post from a social media post store for presentation of that social media post.

21. The method of claim 1, wherein receiving the second input stream further comprises:
receiving the second input stream responsive to a further set of filtering criteria, the one or more social media posts of the second input stream conforming to the further set of filtering criteria.

22. The method of claim 21, wherein the further set of filtering criteria comprises filtering criteria that specify the user and does not comprise the content-specific filtering criteria.

23. Apparatus for processing social media posts, the apparatus including:
a filtering module configured to:
receive a first input stream comprising a first plurality of social media posts from a social networking service, the social media posts of the first input stream having been published concurrently with a first presentation of a certain multimedia content;
acquire one or more content-specific filtering criteria that relate to the certain multimedia content;
filter, in accordance with the content-specific filtering criteria, the first input stream to extract, from the first input stream, a second plurality of social media posts, each of the second plurality of social media posts relating to the certain multimedia content;
receive, from the social networking service, a second input stream comprising a third plurality of social media posts, the social media posts of the second input stream having been published concurrently with a second presentation of the certain multimedia content, the second presentation of the certain multimedia content being time-shifted relative to the first presentation of the certain multimedia content; and
filter, in accordance with the content-specific filtering criteria, the second input stream to extract, from the second input stream, a fourth plurality of social media posts, each of the fourth plurality of social media posts relating to the certain multimedia content; and a storage module operatively coupled to the filtering module and configured to:
store data corresponding to each of the second plurality of social media posts, thereby storing a first data set; and
store data corresponding to each of the fourth plurality of social media posts, thereby storing a second data set; wherein
the first data set is for ascertaining a time reference for each of the second plurality of social media posts, such that the second plurality of social media posts is accessible for future provision to a playback device associated with a user, and for playback, in the playback device, synchronously with a playback by the user of the certain multimedia content;
the second data set is for ascertaining a time reference for each of the fourth plurality of social media posts, such that the fourth plurality of social media posts is accessible for future provision to the playback device, and for playback, in the playback device, synchronously with a playback by the user of the certain multimedia content; and
the second data set comprises, for each social media post of the fourth plurality that includes information relating to an event that occurs within the certain multimedia content after the time corresponding to the time reference of that social media post, a spoiler indicator.

24. A method of processing social media posts, the method including:
receiving, by a filtering module, a first input stream comprising a first plurality of social media posts from a social networking service, each of the first plurality of social media posts having been published concurrently with a first presentation of a certain multimedia content;
using one or more content-specific filtering criteria that relate to the certain multimedia content, filtering, by the filtering module, the first input stream to identify, from the first input stream, one or more social media posts that relate to the certain multimedia content, thereby providing a first set of social media posts;
for each social media post in the first set, ascertaining a time reference for that social media post, a time reference being a reference to a time within the certain multimedia content;
for each social media post in the first set, storing, in a storage module operatively coupled to the filtering module, data corresponding to that social media post such that that social media post may be acquired at a future time;
receiving, from the social networking service, by the filtering module, a second input stream comprising a second plurality of social media posts, each of the second plurality of social media posts having been published concurrently with a second presentation of the certain multimedia content, the second presentation of the certain multimedia content occurring some time after the first presentation of the certain multimedia content;
using the one or more content-specific filtering criteria that relate to the certain multimedia content, filtering, by the filtering module, the second input stream to identify, from the second input stream, one or more social media posts that relate to the certain multimedia content, thereby providing a second set of social media posts;
for each social media post in the second set, ascertaining a time reference for that social media post, a time reference being a reference to a time within the certain multimedia content;

for each social media post in the second set, storing, in a storage module operatively coupled to the filtering module, data corresponding to that social media post such that that social media post may be acquired at a future time; wherein for each social media post in the first set, the stored data for that social media post includes the time reference for that social media post thereby providing for synchronous playback of that social media post with a playback of the certain multimedia content;

for each social media post in the second set, the stored data for that social media post includes the time reference for that social media post thereby providing for synchronous playback of that social media post with a playback of the certain multimedia content; and for each social media post in the second set that relates to an event that occurs within the certain multimedia content after the time corresponding to that time reference of that social media post, the stored data for that social media post includes a spoiler indicator.

* * * * *